(12) United States Patent
Oohira et al.

(10) Patent No.: US 11,861,205 B2
(45) Date of Patent: Jan. 2, 2024

(54) DISTRIBUTED STORAGE SYSTEM AND VOLUME MIGRATION METHOD

(71) Applicant: HITACHI, LTD., Tokyo (JP)

(72) Inventors: Yoshinori Oohira, Tokyo (JP); Shugo Ogawa, Tokyo (JP); Ryosuke Tatsumi, Tokyo (JP); Hiroto Ebara, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/691,918

(22) Filed: Mar. 10, 2022

(65) Prior Publication Data

US 2022/0342552 A1 Oct. 27, 2022

(30) Foreign Application Priority Data

Apr. 27, 2021 (JP) ................. 2021-075168

(51) Int. Cl.
G06F 3/06 (2006.01)
(52) U.S. Cl.
CPC ............. *G06F 3/065* (2013.01); *G06F 3/061* (2013.01); *G06F 3/064* (2013.01); *G06F 3/0631* (2013.01); *G06F 3/0637* (2013.01); *G06F 3/0644* (2013.01); *G06F 3/0665* (2013.01); *G06F 3/0688* (2013.01)
(58) Field of Classification Search
CPC ........ G06F 3/065; G06F 3/061; G06F 3/0631; G06F 3/0637; G06F 3/0644; G06F 3/0665; G06F 3/0688
See application file for complete search history.

(56) References Cited

U.S. PATENT DOCUMENTS

| | | | |
|---|---|---|---|
| 10,031,682 B1 * | 7/2018 | George | G06F 3/0647 |
| 11,366,682 B1 * | 6/2022 | Krasilnikov | G06F 9/45558 |
| 2013/0036279 A1 * | 2/2013 | Tatara | G06F 3/0619 |
| | | | 711/E12.009 |

FOREIGN PATENT DOCUMENTS

| | | |
|---|---|---|
| JP | 2016-510440 A | 4/2016 |
| WO | 2014-147657 A1 | 9/2014 |

* cited by examiner

*Primary Examiner* — Nanci N Wong
(74) *Attorney, Agent, or Firm* — Volpe Koenig

(57) ABSTRACT

A volume to which a storage function is applied is migrated without copying data written to a volume as a migration object between computers while maintaining functionality of the storage function. A plurality of computers are accessibly connected to each of one or more physical storage devices. Each computer migrates ownership of the volume as the migration object to a computer as a destination. When the migration object volume from a first computer to a second computer is an owner volume to which a storage function is applied, the storage function requiring control data for I/O of data, the control data being metadata other than domain mapping data (indicating a relationship between a volume region and a storage region and being metadata for the owner volume), in place of or in addition to the domain mapping data.

10 Claims, 25 Drawing Sheets

FIG. 6

CHUNK GROUP MANAGEMENT TABLE
600

| CHUNK GROUP # | DATA REDUNDANCY # | CHUNK # |
|---|---|---|
| 000 | RAID5 (3D1P) | C11, C21, C31, C41 |
| 001 | RAID6 (3D2P) | C12, C22, C32, C42, C51 |
| 002 | RAID5 (4D1P) | C13, C23, C33, C43, C52 |
| 003 | RAID5 (3D1P) | C24, C34, C44, C53 |
| ... | ... | ... |

PAGE MAPPING TABLE
700

| VOLUME # | VOLUME REGION BEGINNING ADDRESS | CHUNK GROUP # | OFFSET WITHIN CHUNK GROUP |
|---|---|---|---|
| 000 | 0000 | 1 | 2000 |
| 000 | 1000 | 1 | 1000 |
| 001 | 0000 | 1 | 2000 |
| 001 | 1000 | 2 | 0000 |
| ... | ... | ... | ... |

FIG. 7B

EMPTY PAGE MANAGEMENT TABLE
710

| CHUNK GROUP # | OFFSET WITHIN CHUNK |
|---|---|
| 1 | 3000 |
| 1 | 5000 |
| 1 | 6000 |
| 2 | 1000 |
| ... | ... |

FIG. 10

I/O STATISTICAL TABLE
1000

| VOLUME # | PAGE WITHIN VOLUME # | IOPS | HIERARCHY DETERMINATION RESULT |
|---|---|---|---|
| 0000 | 1 | 300 | SSD |
| 0000 | 2 | 500 | SSD |
| 0001 | 1 | 0 | HDD |
| 0001 | 2 | 20 | HDD |

FIG. 14

REMOTE COPY MANAGEMENT TABLE 1400

| PRIMARY VOLUME # | STORAGE CLUSTER # | SERVER # | SECONDARY VOLUME # | REMOTE COPY STATE | JOURNAL VOLUME # |
|---|---|---|---|---|---|
| 000 | 0 | 1 | 001 | PAIR | 100 |
| 001 | 0 | 1 | 002 | PAIR | 100 |
| 002 | 0 | 2 | 003 | COPY | 101 |
| 003 | 1 | 1 | 001 | SUSPEND | 200 |

FIG. 15

JOURNAL MAPPING TABLE 1500

| VOLUME REGION # | SECONDARY VOLUME # | REFLECTION DESTINATION ADDRESS | TRANSFER STATE |
|---|---|---|---|
| 0000 | 0000 | 1000 | VALID |
| 0001 | 0001 | 2000 | INVALID |
| 0002 | 0000 | 3000 | HANDOVER/0000 |
| 0003 | 0000 | 4000 | PROXY/0001 |

FIG. 20

SNAPSHOT MANAGEMENT TABLE 2000

| VOLUME # (2001) | PARENT VOLUME # (2002) | SNAPSHOT TIME (2003) | SNAPSHOT STATE (2004) |
|---|---|---|---|
| 0001 | 0000 | 12 : 00 | BEING ACQUIRED |
| 0002 | 0000 | 16 : 00 | ACQUIRED |
| 0004 | 0003 | 12 : 00 | BEING ACQUIRED |

FIG. 21

SNAPSHOT MAPPING TABLE 2100

| VOLUME # (2101) | ADDRESS WITHIN VOLUME (2102) | STORAGE DEVICE # (2103) | ADDRESS WITHIN STORAGE DEVICE (2104) |
|---|---|---|---|
| 0000 | 0000 | 0000 | 1000 |
| 0000 | 1000 | 0001 | 2000 |
| 0001 | 0000 | 0002 | 1000 |

DISTRIBUTED STORAGE SYSTEM AND VOLUME MIGRATION METHOD

BACKGROUND

The present invention generally relates to storage control of a distributed storage system.

Software-Defined Storage (SDS) for establishing a storage system using a general-purpose server has recently become the mainstream. Hyper Converged Infrastructure (HCI) to store application and storage control software together on a general-purpose server is now widely recognized as one aspect of SDS. Hereinafter, a storage system, in which HCI is used as one aspect of SDS, is referred to as "SDS/HCI system".

On the other hand, a Nonvolatile Memory Express Over Fabric (NVMe-oF) technique as a protocol for high-speed data communication via a network is now spreading as a technique for effectively using a flash device fast in data readout. High-speed data communication is also enabled with a flash device via a network by using such a protocol. On these backgrounds, aiming to integrate the flash device on network, a drive-box product called Fabric-attached Bunch of Flash (FBOF) is now appearing in market.

In a known system configuration, a drive box including a plurality of drives is shared by a plurality of storage controllers (for example, see Japanese Unexamined Patent Application Publication (Translation of PCT Application) No. 2016-510440).

SUMMARY

In a typical distributed storage system, since a storage performance resource (for example, central processing unit (CPU)) and a storage capacity resource (for example, drive) are stored together in the same server, storage performance and storage capacity cannot be independently scaled. Hence, the storage performance resource or the storage capacity resource must be excessively provided depending on performance requirements and capacity requirements, which requires a useless resource, resulting in an increase in system cost. When an application is migrated between servers for load distribution or the like, data used by the application also needs to be migrated, which increases a network load and time for migration of an application between servers.

In a distributed storage system using a system configuration in which a plurality of servers are connected to a drive box such as FBOF, storage performance and storage capacity can be independently scaled by integrating data stored in the respective servers in the drive box.

In such a distributed storage system, each server can directly access a drive mounted in a drive box. In other words, each drive is shared by the servers. Hence, each server can migrate data (data in charge charged by the server itself) written to a volume (volume the ownership of which is held by that server) of the server (the relevant server) to another sever without data copy.

On the other hand, in one configuration for reducing communication frequency between servers in the distributed storage system, metadata related to a volume (for example, configuration information containing information indicating data arrangement) is located only in a server having the ownership of that volume. In such a case, it is difficult to migrate data charge between the servers while maintaining functionality of a storage function.

A plurality of computers are accessibly connected via a communication network to each of one or more physical storage devices in a storage unit. Each computer performs input/output (I/O) of data to/from an owner volume the ownership of which is owned by the computer. The computer writes data, which is written into a volume region as a write destination of the owner volume of the computer, into a storage region allocated to the volume region as the write destination in a physical storage region provided by the one or more physical storage devices. The computer has domain mapping data indicating a relationship between a volume region in the owner volume of the computer and a storage region in the physical storage region and being metadata for that owner volume. When the owner volume of the computer is a migration object, the computer migrates the ownership of that volume to a computer as a destination.

An owner volume of a first computer is a storage owner volume, and the storage owner volume is an owner volume to which a storage function is applied, the storage function requiring control data for I/O of data, the control data being metadata other than the domain mapping data, in place of or in addition to the domain mapping data. When the first computer identifies that a volume as a migration object from the first computer to a second computer is the storage owner volume, the first computer copies the control data of the storage owner volume to the second computer.

According to the invention, in a distributed storage system, it is possible to migrate a volume to which a storage function is applied while maintaining functionality of the storage function without copying data written to a volume as a migration object between computers.

BRIEF DESCRIPTION OF THE DRAWINGS

FIG. 6 illustrates an exemplary configuration of a chunk group management table according to the embodiment of the invention.

FIG. 7A illustrates an exemplary configuration of a page mapping table according to the embodiment of the invention.

FIG. 7B illustrates an exemplary configuration of an empty page management table according to the embodiment of the invention.

FIG. 10 illustrates an exemplary configuration of an I/O statistical table according to the embodiment of the invention.

FIG. 14 illustrates an exemplary configuration of a remote copy management table according to the embodiment of the invention.

FIG. 15 illustrates an exemplary configuration of a journal mapping table according to the embodiment of the invention.

FIG. 20 illustrates an exemplary configuration of a snapshot management table according to the embodiment of the invention.

FIG. 21 illustrates an exemplary configuration of a snapshot mapping table according to the embodiment of the invention.

DETAILED DESCRIPTION

Figure 1:
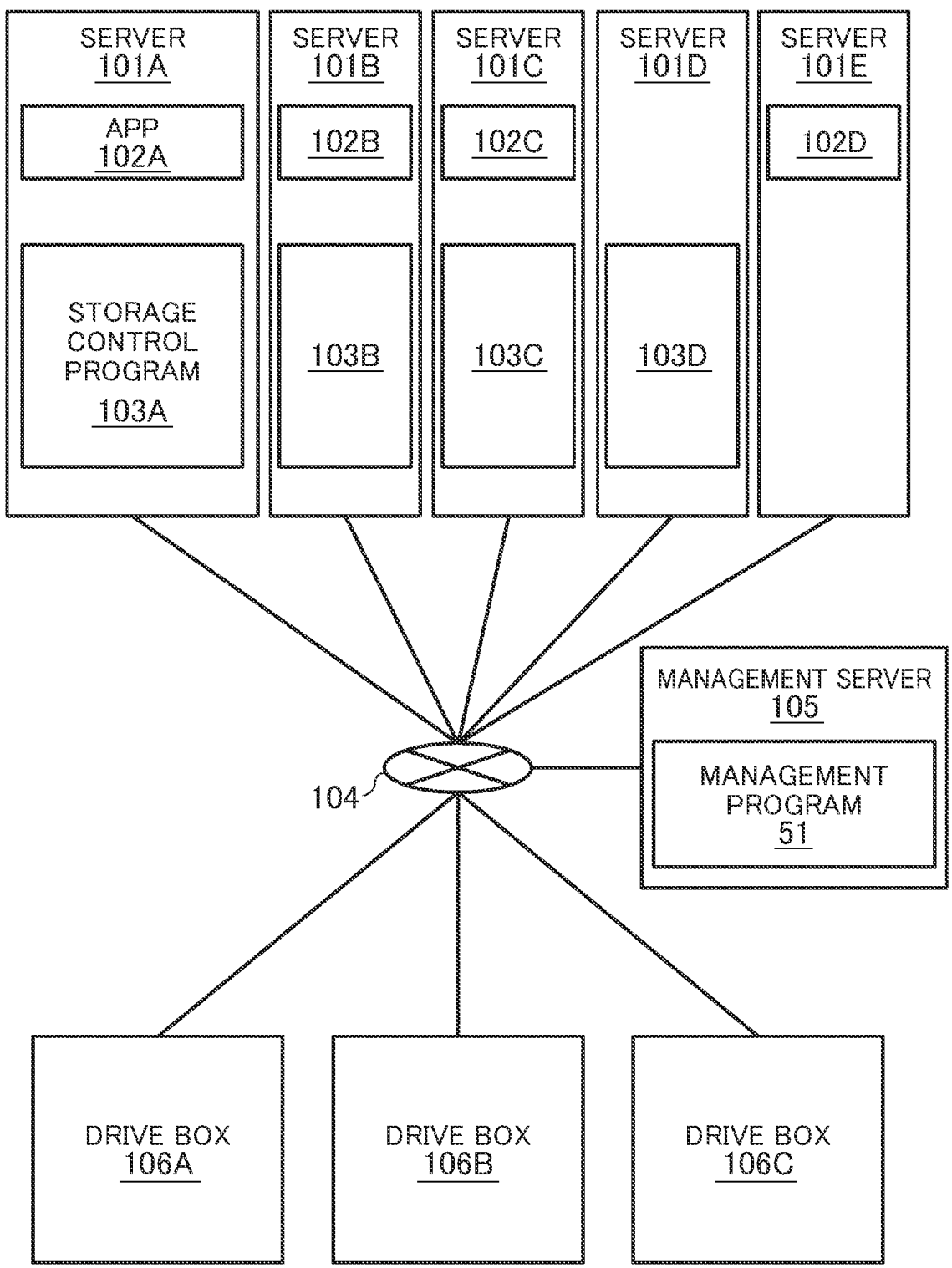
FIG. 1 illustrates an outline of a distributed storage system according to one embodiment of the invention.

In the following description, "communication interface device" may be one or more communication interface device. The one or more communication interface devices may be one or more identical communication interface device (for example, one or more network interface cards (NICs)) or two or more different communication interface devices (for example, NIC and host bus adapter (HBA)).

In the following description, "memory" is at least one memory device as one example of one or more storage device, and typically may be a main storage device. The at least one memory device of the memory may be a volatile memory device or a nonvolatile memory device.

In the following description, "storage unit" is one example of a unit including one or more physical storage device. The physical storage device may be a persistent storage device. The persistent storage device may be typically a nonvolatile storage device (for example, auxiliary storage device), specifically, for example, may be a hard disk drive (HDD), a solid state drive (SSD), a non-volatile memory express (NVMe) drive, or a storage class memory (SCM). In the following description, "one or more drive box" means one example of the storage unit, and "drive" means one example of the physical storage device.

In the following description, "processor" may be one or more processor device. The one or more processor device may typically be a microprocessor device such as a central processing unit (CPU), but may be another type of processor device such as a graphics processing unit (GPU). The one or more processor device may be a single-core or multi-core processor device. The one or more processor device may be a processor core. The one or more processor device may be a processor device in a broad sense, such as a circuit as an assembly of gate arrays with a hardware description language performing part or all of processing (for example, field-programmable gate array (FPGA), complex programmable logic device (CPLD), or application specific integrated circuit (ASIC)).

In the following description, although such information that output is produced in response to input is sometimes described with expression of "xxx table", the information may be data of any structure (for example, may be structured data or unstructured data), a neural network that produces an output in response to an input, or a learning model typified by a genetic algorithm or random forests. Hence, "xxx table" can be mentioned as "xxx information". In the following description, a configuration of each table is merely one example, and one table may be divided into two or more tables, or all or some of two or more tables may be included in one table.

In the following description, although processing may be described with "program" as the subject, since the program is executed by a processor to perform determined processing while appropriately using a memory and/or a communication interface device, the subject of the processing may be mentioned as a processor (or a device such as a controller having the processor). The program may be installed from a program source into a device such as a computer. The program source may be a program distribution server or a computer readable (for example, non-transitory) recording medium. In the following description, two or more programs may be implemented as one program, or one program may be implemented as two or more programs.

In the following description, when identical elements are described interchangeably, a common sign (or reference sign) may be used among reference signs, and when identical elements are discriminated from each other, reference signs (or identifiers of the relevant elements) may be used.

FIG. 1 illustrates an outline of a distributed storage system according to one embodiment of the invention.

The distributed storage system of this embodiment has "separate-drive distributed storage configuration" in which a direct attached storage (DAS) for SDS or HCI is integrated in a drive box 106 such as FBOF connected to a general-purpose network 104. Storage performance and storage capacity can be independently scaled by integrating data into the drive box 106.

In such a configuration, each server 101 can directly access a drive mounted in the drive box 106, and each drive is shared between servers 101. Hence, each server 101 can individually perform data protection for its data in charge (data written by the server 101) without cooperation with another server 101. Further, the servers 101 share metadata on a data protection method (for example, an RAID (Redundant Array of Independent Disk) configuration or a data arrangement pattern (arrangement pattern of data and parity) for each chunk group (group configured of two or more chunks each chunk being a drive region within a drive box (as described in detail later)). Consequently, when charge of data to be charged is changed between the servers 101, information that maps data in charge to a chunk group as storage destination of the data in charge is copied to a change destination server 101, thereby data protection can be continued without data copy via a network 104.

In this embodiment, one of the servers 101 configuring the distributed storage system is a representative server 101, the representative server 101 determines an RAID configuration or a data arrangement pattern on each chunk of an expanded drive at drive expansion, the relevant metadata is shared between the servers 101, and at least a chunk in the expanded drive is included in at least one chunk group (for example, one or more new chunk group and/or one or more existing chunk groups). When writing data into the chunk group, each server 101 associates data with a chunk group and independently performs data protection based on the above metadata without cooperation with another server 101.

When a server in charge of data to be charged is changed between the servers 101, information indicating an association of the data to be charged with a chunk group, the information being owned by a source server 101 (server 101 having been in charge of the data to be charged) is copied to a destination server 101 (server 101 to be in charge of the data to be charged). After that, the destination server 101 individually performs data protection without cooperation with another server 101 based on the metadata indicating the chunk group of the data to be charged.

The distributed storage system of this embodiment is configured of the plurality of servers 101 (for example, 101A to 101E) connected to the network 104, the plurality of drive boxes 106 (for example, 106A to 106C) connected to the network 104, and a management server 105 connected to the network 104. The distributed storage system of this embodiment may be one example of a SDS/HCI system. A single storage control program 103 and a plurality of apps 102 (or a single app 102) operatively coexist in each server 101. However, all the servers 101 in the distributed storage system need not include both the apps 102 and the storage control program 103, and some of the servers 101 may not include either the apps 102 or the storage control program 103. Even if a server 101 including the apps 102 and no storage control program 103 or a server 101 including the storage control program 103 and no app 102 exists in a distributed storage system, such a distributed storage system is effective as the distributed storage system of this embodiment. The term "app" is abbreviation of application program. The term "storage control program" may be referred to as storage control software. The term "server 101" may be abbreviation of node server 101. A plurality of general-purpose computers may be established as software-defined anything (SDx) by each of the computers executing predetermined software. For example, software-defined storage (SDS) or software-defined datacenter (SDDC) may be used as the SDx. The server 101 is one example of the computer. The drive box 106 is one example of the storage unit.

An execution framework of the app 102 probably include, but is not limited to, a virtual machine and a container.

Data written from the app 102 is stored in any one of the drive boxes 106A to 106C connected to the network 104 via the storage control program 103. A versatile network technique such as Ethernet or Fibre Chunnel can be used for the network 104. The network 104 may connect the server 101 to the drive box 106 directly or via one or more switches. A versatile technique such as Internet•SCSI (iSCSI) or NVMe over Fabrics (NVMe-oF) can be used for a communication protocol.

The storage control programs 103 of the respective servers 101 configure a distributed storage system with a plurality of servers 101 being bundled through cooperative operation. Thus, when a failure occurs in one server 101, the storage control program 103 of another server 101 substitutes for relevant processing, and thus I/O can be continued. Each storage control program 103 can have a data protection function and a storage function such as snapshot.

The management server 105 has a management program 51. The management program 51 may be referred to as management software. For example, the management program 51 includes information indicating a configuration of a chunk group in the metadata. Processing performed by the management program 51 is described later.

According to the distributed storage system of this embodiment, data as a protection object need not be transferred for protection between the servers 101 via the network 104. When a failure occurs in a storage control program 103, another storage control program 103 sharing metadata may access data stored in a chunk. When a failure occurs in a drive, the storage control program 103 may restore data in the failed drive using data that is stored in another drive without failure while being made redundant.

Figure 2:
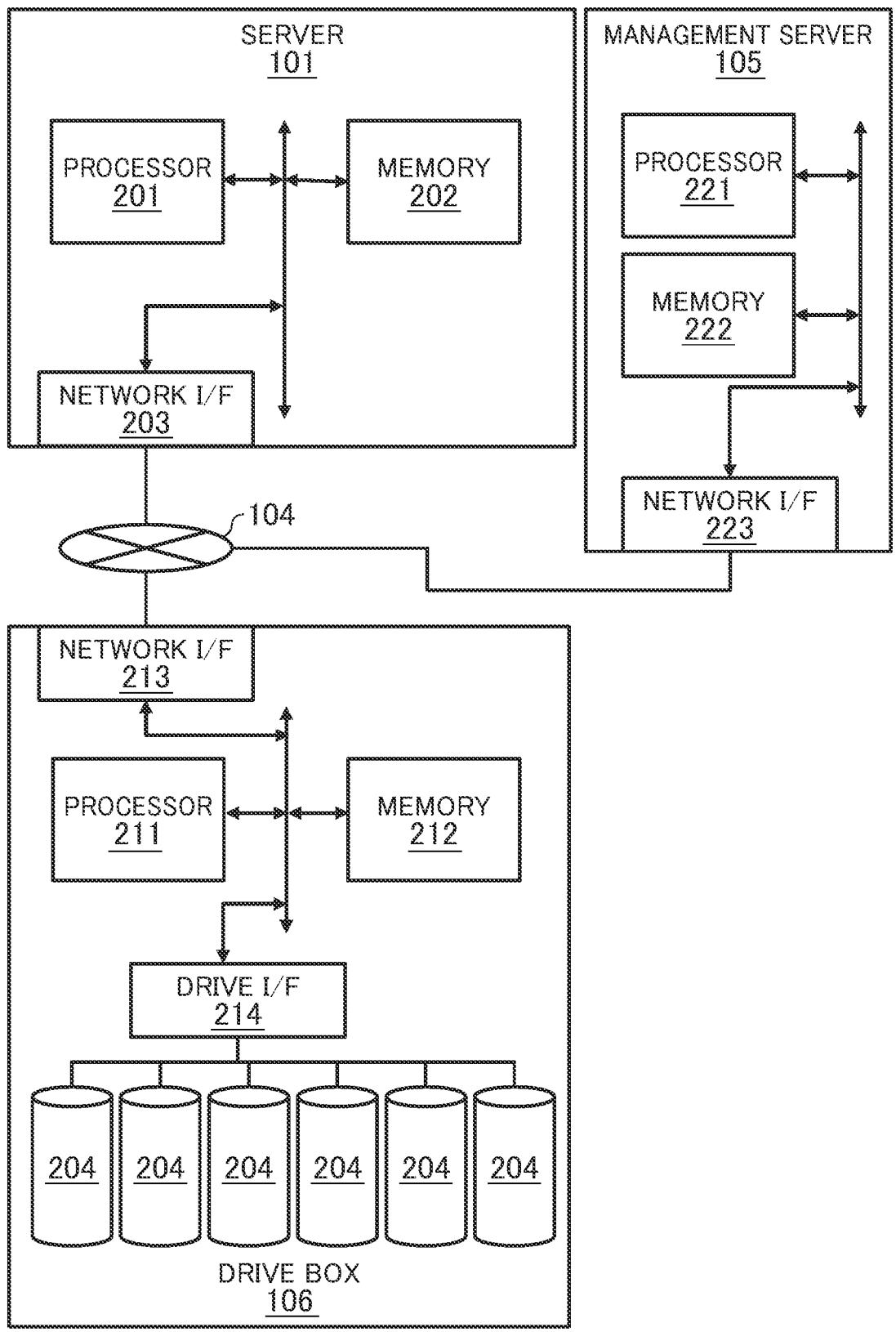
FIG. 2 illustrates an exemplary hardware configuration including a server, a management server, and a drive box according to the embodiment of the invention.

FIG. 2 illustrates an exemplary hardware configuration including the server 101, the management server 105, and the drive box 106 in this embodiment.

The server 101 includes a memory 202, a network I/F 203 (one example of a communication interface device), and a processor 201 connected to them. The memory 202, the network I/F 203, and/or the processor 201 may be multiplexed (for example, duplexed). The memory 202 stores the app 102 and the storage control program 103, and the processor 201 executes the app 102 and the storage control program 103.

Similarly, the management server 105 includes a memory 222, a network I/F 223 (one example of a communication interface device), and a processor 221 connected to them. The memory 222, the network I/F 223, and/or the processor 221 may be multiplexed (for example, duplexed). The memory 222 stores a management program 51, and the processor 221 executes the management program 51.

The drive box 106 includes a memory 212, a network I/F 213, a drive I/F 214, and a processor 211 connected to them. The network I/F 213 and the drive I/F 214 are each one example of a communication interface device. The drive I/F 214 is connected to a plurality of drives 204. The server 101, the management server 105, and the drive box 106 are connected to the network 104 via the network I/Fs 203, 223, and 213 and thus can communicate with one another. The drive 204 may be a versatile drive such as a hard disk drive (HDD) or a solid state drive (SSD). Naturally, the invention may use another type of drive without depending on a drive type or a form factor.

Figure 3:
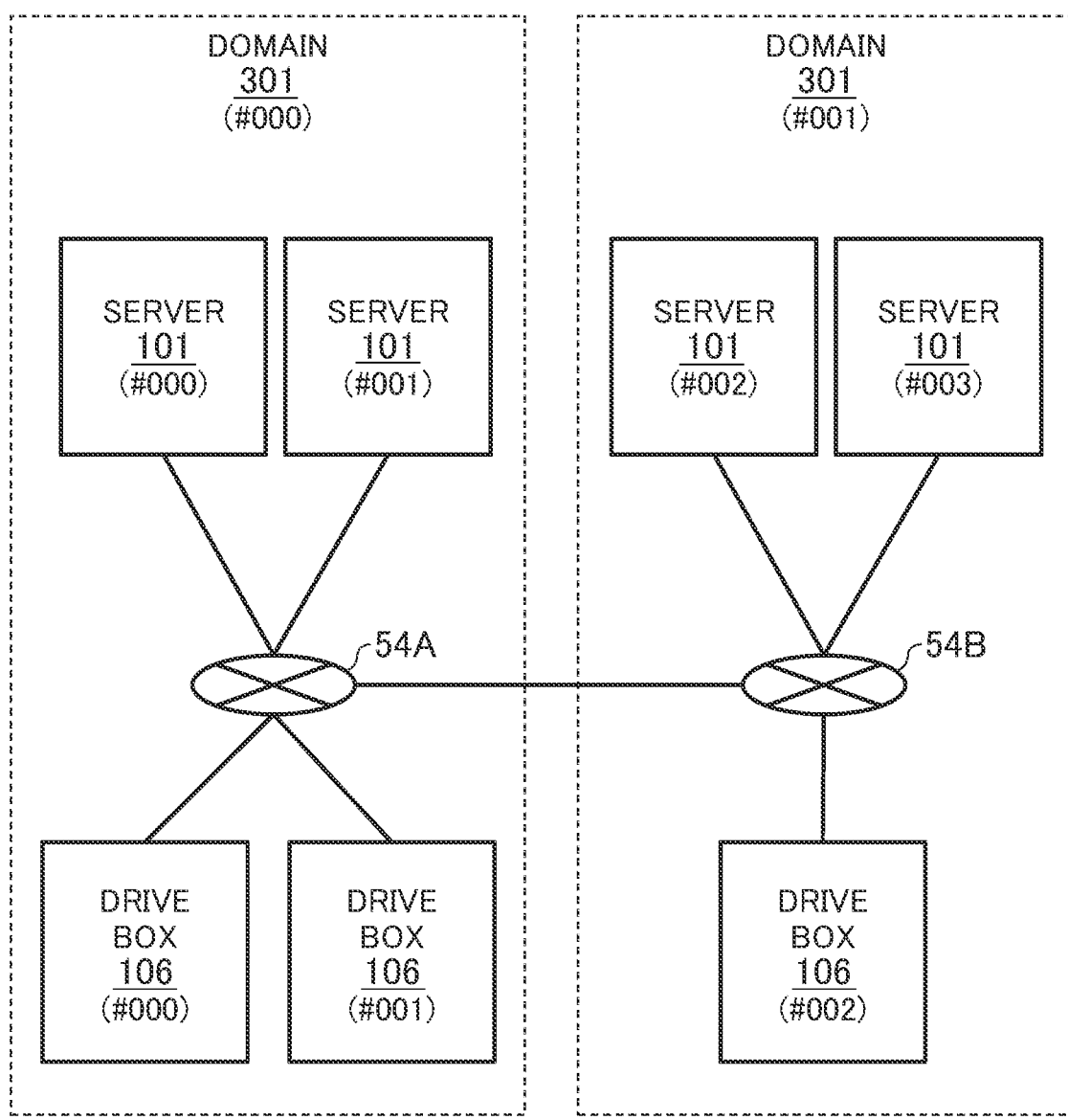
FIG. 3 illustrates an example of partitioning of the distributed storage system according to the embodiment of the invention.

FIG. 3 illustrates one example of partitioning of the distributed storage system of this embodiment.

The distributed storage system may be partitioned into a plurality of domains 301. In other words, the server 101 and the drive box 106 may be managed in units called "domains". In this configuration, data written to a volume by the app 102 is stored via the storage control program 103 in any one of drive boxes 106 belonging to the same domain 301 as the server 101 in which the app 102 operates. For example, data as a write object generated in servers 101 (#000) and 101 (#001) belonging to a domain 301 (#000) are stored in one or both of drive boxes 106 (#000) and 106 (#001) via a subnetwork 54A, and data as a write object generated in servers 101 (#002) and 101 (#003) belonging to a domain 301 (#001) are stored in a drive box 106 (#002). The distributed storage system is thus configured using the domains, so that when a failure occurs in the drive box 106 or the drive 204, influence on server performance can be separated between the domains 301.

For example, according to the example shown in FIG. 3, the network 104 includes the subnetworks 54A and 54B (one example of a plurality of sub communication networks). The domain 301 (#000) (one example of each of the plurality of domains) includes the servers 101 (#000) and 101 (#001) and the drive boxes 106 (#000) and 106 (#001) connected to the subnetwork 54A corresponding to the domain 301 (#000), and does not include the servers 101 (#002) and 101 (#003) and the drive box 106 (#002) connected to the subnetwork 54A via another subnetwork 54B. Consequently, even if the subnetwork 54A is disconnected from the subnetwork 54B, data written to the drive box 106 can be still read in each of regions of the domains 301 (#000) and 301 (#001).

Figure 4:
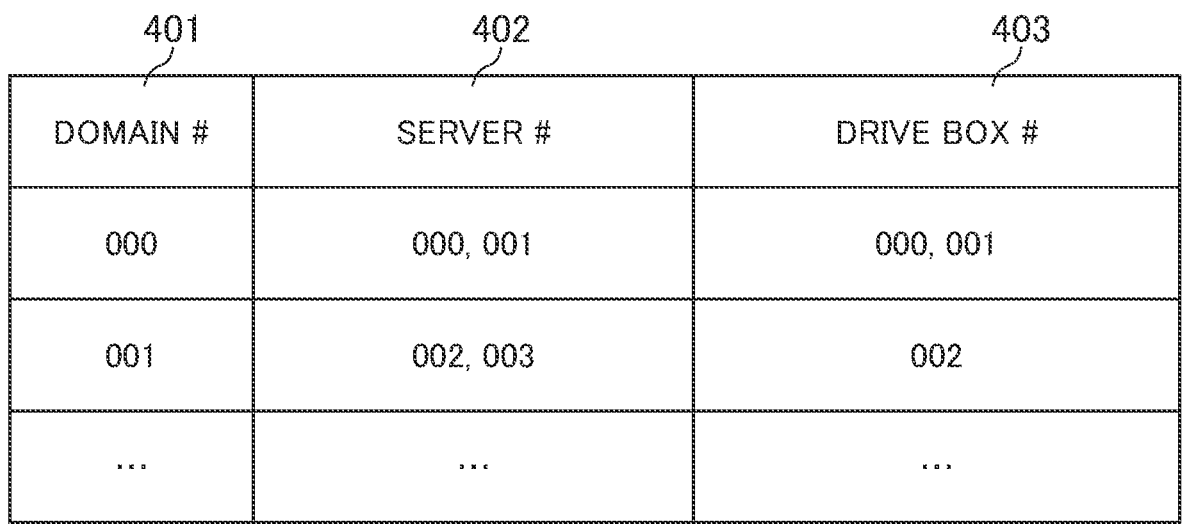
FIG. 4 illustrates an exemplary configuration of a domain group management table according to the embodiment of the invention.

FIG. 4 illustrates an exemplary configuration of a domain management table 400.

The domain management table 400 is to manage, for each domain 301, a server group and a drive box group configuring the domain 301. The domain management table 400 has records for each domain 301. Each record holds information including a domain #401, a server #402, and a drive box #403. One domain 301 is exemplified ("object domain 301" in description of FIG. 4).

The domain #401 indicates an identifier of the object domain 301. The server #402 indicates an identifier of a server 101 belonging to the object domain. The drive box #403 indicates an identifier of a drive box 106 belonging to the object domain.

Figure 5:
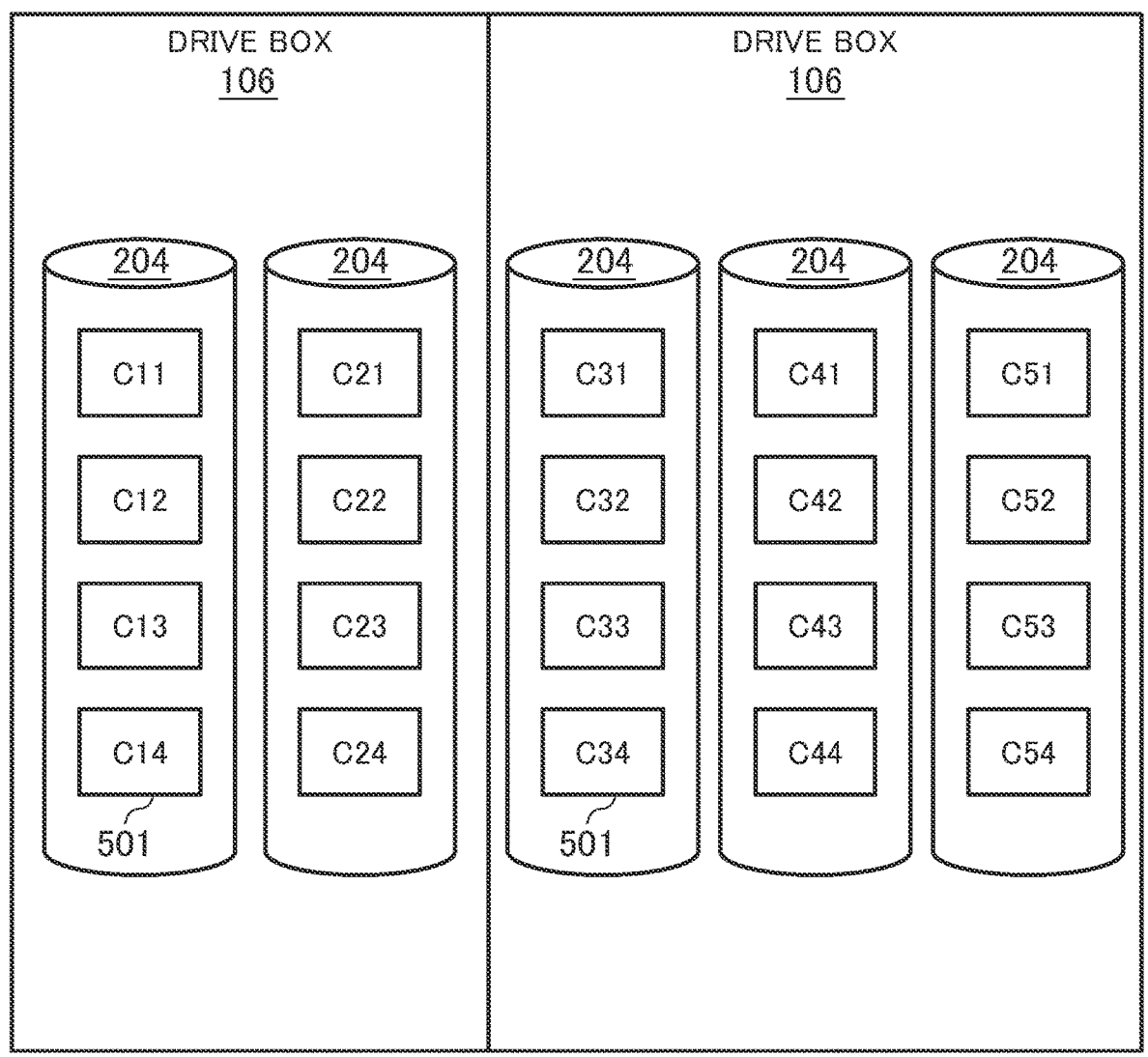
FIG. 5 illustrates an example of drive region management according to the embodiment of the invention.

FIG. 5 illustrates one example of drive region management of this embodiment.

In this embodiment, a plurality of drives 204 mounted in the drive box 106 are managed while being divided into a plurality of fixed-size regions called "chunks" 501. In this embodiment, a chunk group, which is a storage region as a combination of a plurality of chunks belonging to a plurality of different drives, has the RAID configuration. A plurality of data elements configuring a redundant data set are written into a relevant chunk group according to an RAID level (data redundancy or a data arrangement pattern) in accordance with the RAID configuration of the relevant chunk group. Data protection is performed using a typical RAID/EC technique according to the RAID configuration of the relevant chunk group. In description of this embodiment, terms on the storage region are defined as follows.

"Volume region" is a partial storage region in the volume.

"Chunk" is part of the entire storage region provided by one drive 204, where one drive 204 provides a plurality of chunks.

"Chunk group" is a storage region configured of two or more respective different chunks provided by two or more different drives 204. Here, "two or more different drives 204" providing one chunk group may be closed in one drive box 106, or may straddle two or more drive boxes 106.

"Page" is a storage region configured of parts of the respective two or more chunks configuring the chunk group. Although the page may be the chunk group itself, one chunk group is configured of a plurality of pages in this embodiment.

"Strip" is part of the entire storage region provided by one drive 204. One strip stores one data element (user data element or parity). The strip may be a storage region of the minimum unit provided by one drive 204. That is, one chunk may be configured of a plurality of strips.

"Stripe" is a storage region configured of two or more different strips (for example, two or more strips of the same logical address) provided by two or more different drives 204. one redundant data set may be written to one stripe. That is, two or more respective data elements configuring one redundant data set may be written to two or more strips configuring one stripe. The stripe may be the whole or part of a page. The stripe may be the whole or part of the chunk group. In this embodiment, one chunk group may be configured of a plurality of pages and one page may be configured of a plurality of stripes. The stripes configuring a chunk group may have the same RAID configuration as that of the chunk group.

"Redundant configuration region" may be one example of the stripe, the page, or the chunk group.

"Drive region" may be one example of a device region, specifically, for example, may be one example of the strip or the chunk.

"Redundant data set" includes data made redundant, and may be configured of a plurality of data elements. Here, "data element" may be either "user data element" as at least part of data from the app 102 or "parity" generated based on two or more user data elements. For example, when data associated with a write request is made redundant according to the RAID level 5 (3D+1P), the redundant data set may be configured of four data elements (three user data elements and one parity). For example, the respective four data elements may be written to four different chunks existing in respective four different drives.

FIG. 6 illustrates an exemplary configuration of a chunk group management table 600.

The chunk group management table 600 is to manage a configuration and a data protection method (RAID level) of each chunk group. The chunk group management table 600 is at least part of metadata 170 as described later. The chunk group management table 600 has a record for each group. Each record holds information including a chunk group #601, data redundancy 602, and a chunk configuration 603. One chunk group is exemplified ("object chunk group" in description of FIG. 6).

The chunk group #601 indicates an identifier of the object chunk group. The data redundancy 602 indicates data redundancy (data protection method) of the object chunk group. The chunk #603 indicates an identifier of a chunk as a component of the object chunk group.

As shown in the example of FIG. 6, a chunk group #000 is configured of four chunks (C11, C21, C31, and C41) and protected by RAID 5 (3D+1P).

Such a chunk group management table 600 is shared as at least part of the metadata 170 by a plurality of servers 101. Hence, even when any server 101 writes data to any chunk group, data protection can be performed in accordance with data redundancy of that chunk group.

The data arrangement pattern is often determined depending on the data redundancy and thus not described.

In this embodiment, at least one storage control program 103 (for example, a storage control program 103 in the representative server 101) may dynamically (for example, depending on write quantity into the drive, i.e., depending on the amount of empty space of one or more configured chunk group), newly configure a chunk group and may add information of the newly configured chunk group to the chunk group management table 600. Consequently, a chunk group of the optimum data redundancy is expectably configured in correspondence to a situation of the distribute storage system, i.e., data redundancy of the chunk group is expectably optimized. Specifically, for example, the following may be acceptable.

A chunk management table may be prepared. The chunk management table may be shared by a plurality of storage control programs 103. The chunk management table may indicate, for each chunk, a drive providing a relevant chunk, a drive box having the drive, and a state of the chunk (for example, whether the chunk is in an empty state in which the chunk is not a component of any chunk group).

When a condition, under which a chunk group is newly created, is satisfied (for example, when the amount of the empty space of one or more created chunk group becomes less than a predetermined value), the storage control program 103 (or management program 51) may newly create a chunk group configured of two or more different empty chunks provided by respective two or more different drives 204. The storage control program 103 (or management program 51) may additionally write information indicating a configuration of the chunk group to the chunk group management table 600. The storage control program 103 may write one or more redundant data set according to data as a write object to the newly created chunk group. Consequently, a chunk group with the optimum data redundancy is expectably created while avoiding depletion of the chunk group.

The storage control program 103 (or management program 51) may determine data redundancy (RAID level) of a chunk group to be created according to a predetermined policy. For example, when the amount of empty space in the drive box is equal to or larger than a predetermined value, the storage control program 103 (or management program 51) may determine the data redundancy of a chunk group, which is to be newly created, to be RAID 6 (3D+2P). When the amount of empty space in the drive box is less than the predetermined value, the storage control program 103 (or management program 51) may determine the data redundancy of a chunk group, which is to be newly created, to be a data redundancy (for example, RAID 5 (3D+1P)) that is enabled by less chunks than the chunks in the case where the amount of empty space in the drive box is equal to or larger than the predetermined value.

In this embodiment, a plurality of chunk groups may be beforehand configured based on all drives 204 in all drive boxes 106.

In this embodiment, as described later, a chunk group on the entire region in a drive may be configured when a drive is added. Such drive addition may be performed on the basis of a drive or of a drive box.

FIG. 7A illustrates an exemplary configuration of a page mapping table 700.

As described above, in this embodiment, a write region is provided to the app 102 by a unit called volume. The region of each chunk group is managed by pages each being a smaller fixed size region than the chunk group, and is made corresponding to the volume region. The page mapping table 700 is to manage a correspondence relationship between the volume region and the page (partial region of the chunk group). Although a page is allocated to any region of a volume when the volume is created in this embodiment, the page may be dynamically allocated to a volume region as a write destination using a technique called Thin Provisioning.

The page mapping table 700 has a record for each volume region. Each record holds information including a volume #701, a volume region beginning address 702, a chunk group #703, and offset-within-chunk group 704. One volume region is exemplified ("object volume region" in description of FIG. 7A).

The volume #701 indicates an identifier of a volume containing the object volume region. The volume region beginning address 702 indicates a beginning address of the object volume region. The chunk group #703 indicates an identifier of a chunk group containing a page allocated to the object volume region. The offset-within-chunk group 704 indicates a position of a page allocated to an object region (a difference from a beginning address of the chunk group containing the page to a beginning address of the page).

FIG. 7B illustrates an exemplary configuration of an empty page management table 710.

The empty page management table 710 is for each server 101 to manage an empty page allocatable to a volume without communication with another server 101. The empty page management table 710 has a record for each empty page. Each record holds information including a chunk group #711 and an offset-within-chunk group 712. One empty page is exemplified ("object empty page" in description of FIG. 7B).

The chunk group #711 indicates an identifier of a chunk group containing the object empty page. The offset-within-chunk group 712 indicates a position of the object empty page (a difference from a beginning address of a chunk group containing the object empty page to a beginning address of the object empty page).

The empty page is allocated to each server 101 by a representative server 101 (or management server 105), and information of the allocated empty page is added to the table 710. A record of the empty page allocated to a volume created at volume creation is deleted from the table 710. When a server 101 has insufficient empty pages, the representative server 101 (or management server 105) forms a new chunk group, and a region in the chunk group is added as a new empty page to such a server 101. Specifically, in this embodiment, for each server 101, the empty page management table 710 held by the server 101 holds information on a page allocated to the server 101 as a page allocatable to a volume provided in the server 101 among a plurality of pages provided by all drive boxes 106 that can be accessed by the server 101.

Page allocation control at volume creation and details of a sequence of empty page control are not described.

Figure 8:
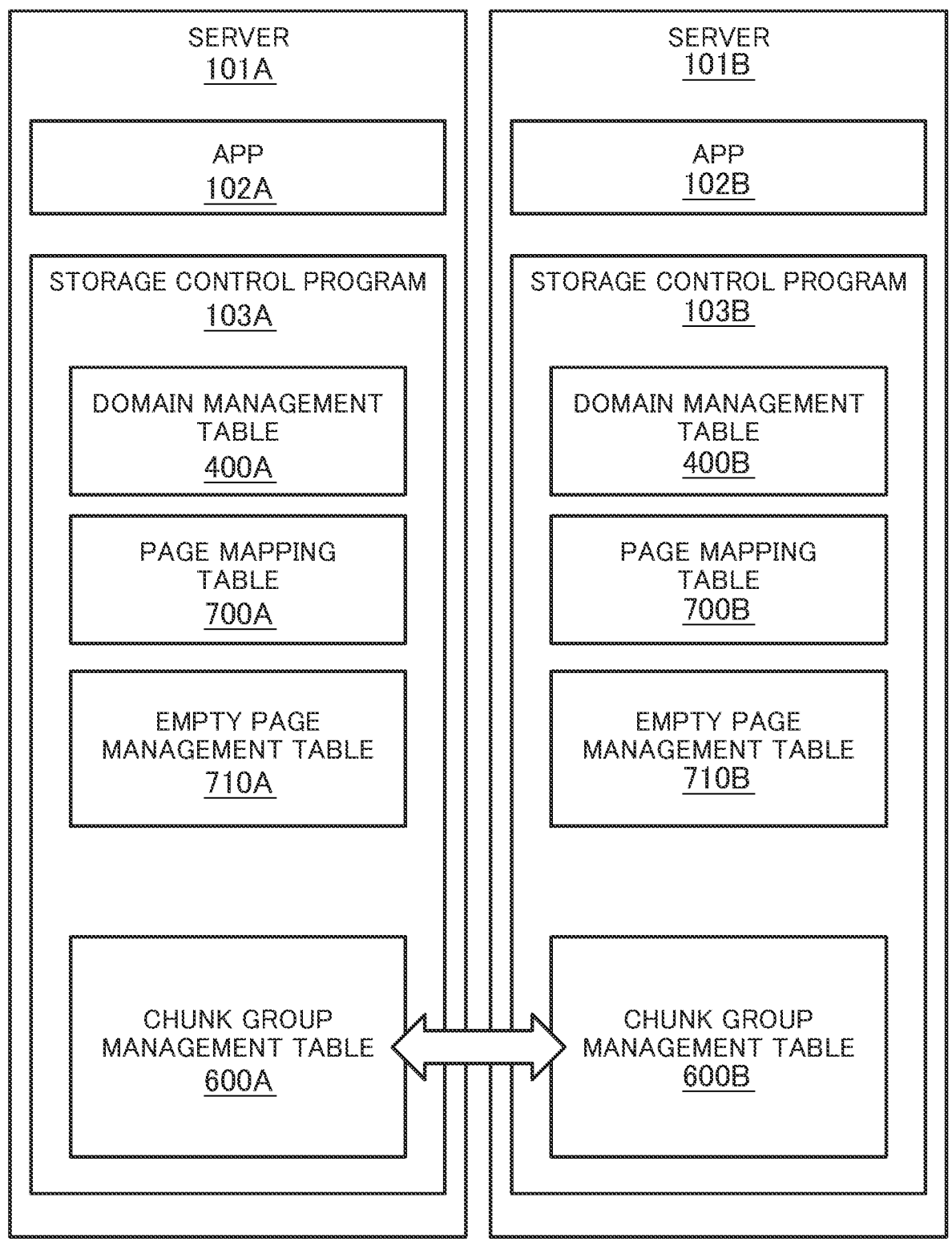
FIG. 8 illustrates an example of table arrangement according to the embodiment of the invention.

FIG. 8 illustrates an example of table arrangement in this embodiment.

The server 101A is exemplarily described as one server. The description on the server 101A can be applied to any other server 101 (for example, server 101B).

First, the server 101A may hold a domain management table 400A indicating a plurality of domains as a plurality of partitions of the distributed storage system.

The server 101A has a page mapping table 700A related to a volume used by an app 102 operating in the server 101A, and an empty page management table 710A holing information on an empty page allocated to the server 101A as an empty page allocatable to a volume. In other words, the server 101A may not have a full-page mapping table of all the servers 101. This is because if the full-page mapping table of all the servers 101 is shared by all the servers 101, the management data amount owned by each server 101 is enlarged, and scalability is affected thereby. However, the page mapping table 700A may be backed up by another server 101 partially configuring the distributed storage system in order to respond to management data loss at a server failure. In this embodiment, "management data" is held by the storage control program 103, and may include the domain management table 400A, the page mapping table 700A, the empty page management table 710A, and the metadata 170A. The metadata 170A may include a chunk group management table 600A. The page mapping table 700A may exist for each volume while having information on one or more volume provided by a storage control program 103A.

Hereinafter, for a certain volume, a server having a page mapping table portion of the volume is referred to as owner server. The owner server can perform high-speed access to metadata on a volume, and can perform high-speed I/O. This embodiment is therefore described with a configuration where an app using the volume is located in the owner server. However, it is possible to locate the app in a server other than the owner server and perform I/O to/from the owner server.

The chunk group management table 600A synchronizes between servers 101 in each of which the storage control program operates. As a result, the same configuration information (the same content) can be referred in all the servers 101. This eliminates the need of reconfiguring a user data element or parity (in other words, the need of data copy via the network 104) when an app and a volume are migrated from the server 101A to another server 101B. Data protection can also be continued in a destination server of the app and the volume even without such a reconstruction (data copy).

The storage control program 103 may refer to the domain management table 400A and the chunk group management table 600A and specify a chunk group, as a data write destination, provided from one or more drive box 106 in the same domain. The storage control program 103 may refer to the domain management table 400A and the chunk group management table 600A, specify two or more empty chunks provided from one or more drive boxes 106 in the same domain (two or more empty chunks provided from two or more different drives), configure a chunk group by such two or more empty chunks (at this time, for example, determine data redundancy of that chunk group depending on a situation of the distributed storage system), and add information of the chunk group to the chunk group management table 600A. Which chunk is provided and which drive box 106 has a drive 204 that provides that chunk may be specified, for example, according to either of the following.

Information of the drive 204 providing a relevant chunk and information of the drive box 106 having the drive 204 are added to the chunk group management table 600 for each chunk.

An identifier of a chunk includes an identifier of the drive 204 providing the chunk and an identifier of the drive box 106 having the drive 204.

The storage control program 103A (one example of each of two or more storage control programs 103) manages the page mapping table 700A (one example of mapping data) on a volume provided by the storage control program 103A itself. For example, in this embodiment, when a volume is newly created, the storage control program 103 may specify empty pages in the number corresponding to the whole volume (pages that are still not allocated to any volume region, i.e., in an allocatable state) and allocate an empty page to the volume. The storage control program 103A may register, in the page mapping table 700A, that the page is allocated to the volume region. The storage control program 103 may write a redundant data set of data associated with a write request into a chunk group containing a page allocated to a volume region as a write destination. Alternatively, even if a volume is newly created, the storage control program 103A may not allocate an empty page to that volume. When the storage control program 103A receives a write request specifying the volume and identifies from the page mapping table 700A that no page is allocated to the volume region specified by the write request, the storage control program 103A may allocate a page to the volume region, register in the page mapping table 700A that the page is allocated to the volume region, and write the redundant data set of the date associated with the write request to the chunk group containing the page.

A failure is assumed to occur in any one of the servers 101, for example, in the server 101A. In such a case, for each of one or more volumes provided by the storage control program 103A in the server 101A, the storage control program 103B in the server 101B selected as a server 101 as a restoration destination of the relevant volume restores the volume based on a page mapping table 700B on the volume (for example, a page mapping table received (copied) from the storage control program 103A), and provides the restored volume to the app 102B. The storage control program 103B can refer to the page mapping table 700B to read data according to one or more redundant data sets from a page allocated to a volume region in the restored volume. In other words, for each of one or more volumes provided by the storage control program 103A, even if an owner server of the volume (server in charge of I/O to/from the volume) is changed from the server 101A to the server 101B, the server 101B can access data of the volume without data migration via the network 104.

The distributed storage system of this embodiment is one example of the SDS/HCI system. The chunk group management table 600 is shared by a plurality of servers 101, the page mapping table 700 (one example of domain mapping data) on a migration object volume is copied from a source server 101 (one example of a first computer) to a destination server 101 (one example of a second computer), and the ownership of the migration object volume (control that is an authority to perform input/output of data to/from the migration object volume) is migrated from the source server 101 to the destination server 101. Consequently, a migration object volume can be migrated between the servers 101 without copying data written to the migration object volume between the servers 101. Although so-called thin provisioning, in which a page (one example of a storage region in a physical storage region provided by one or more drives 204) is dynamically allocated to a volume, is used in the above description, a storage region in a physical storage region may be beforehand allocated to a volume, and the domain mapping data, including the page mapping table 700 as one example, may be data indicating a correspondence relationship between a volume address and an address of the physical storage region.

In this embodiment, not only for the above-described volume, but also for a volume to which a storage function is applied, a migration object volume can be migrated between the servers 101 without copying data written to the migration object volume between the servers 101, and such migration can be performed while maintaining functionality of the storage function. In this embodiment, "storage function" is the following function: control data being metadata other than the page mapping table 700 is required for I/O of data to/from a volume in place of or in addition to the page mapping table 700. One or more storage function may be provided for the distributed storage system. In this embodiment, two or more storage functions are provided. Examples of the storage function include an auto tiering function, a nonsynchronous remote copy function, and a snapshot function.

In this embodiment, each server 101 includes programs executed by the processor 201 of the server 101, including a hierarchy relocation program, a migration program, a journal transfer program, a snapshot acquisition program, and a restoration program as described later, in place of, or in addition to, the app 102 and/or the storage control program 103. The hierarchy relocation program is for the auto tiering function. The journal transfer program is for the asynchronous remote copy function. The snapshot acquisition program and the restoration program are for the snapshot function. The migration program is required for any of the auto tiering function, the asynchronous remote copy function, and the snapshot function. When any one of the storage functions does not exist, the program for such a storage function may also not exist. At least one of the hierarchy relocation program, the migration program, the journal transfer program, the snapshot acquisition program, and the restoration program may be contained in the storage control program.

Figure 12:
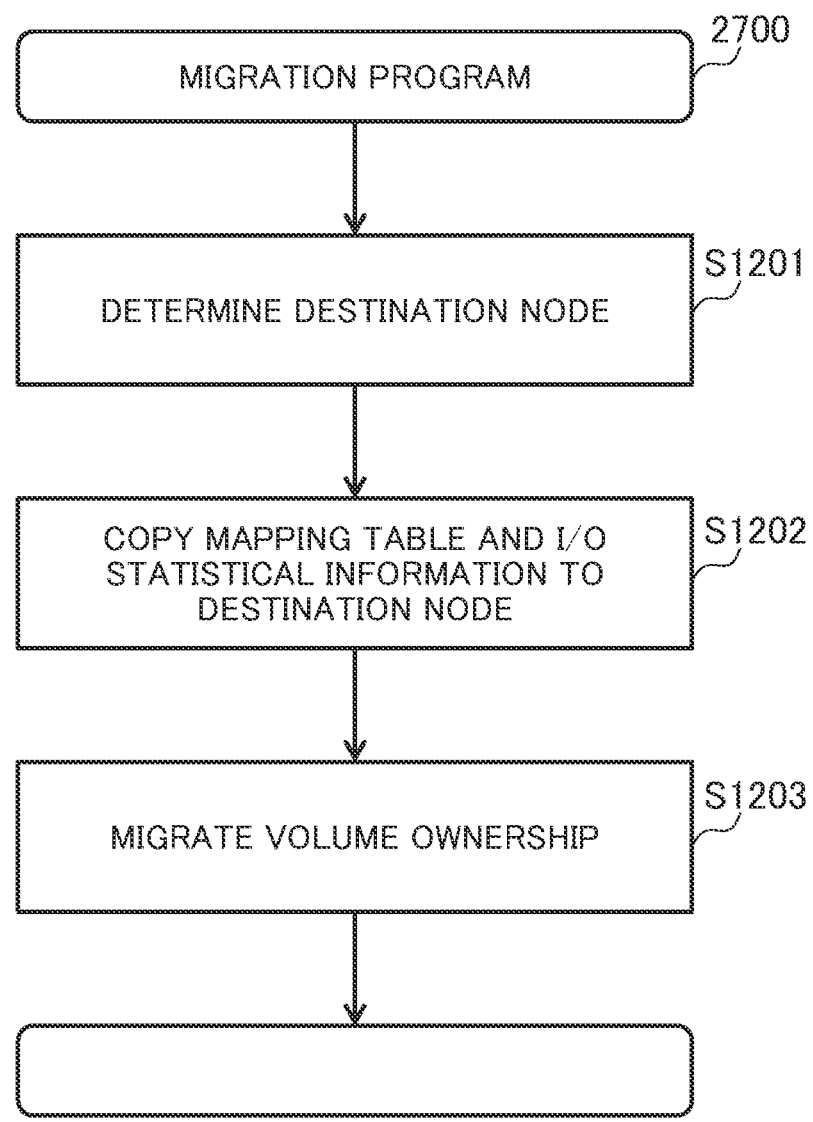
FIG. 12 illustrates one example of a procedure of processing executed by a migration program to migrate the auto tiering owner volume according to the embodiment of the invention.
Figure 17:
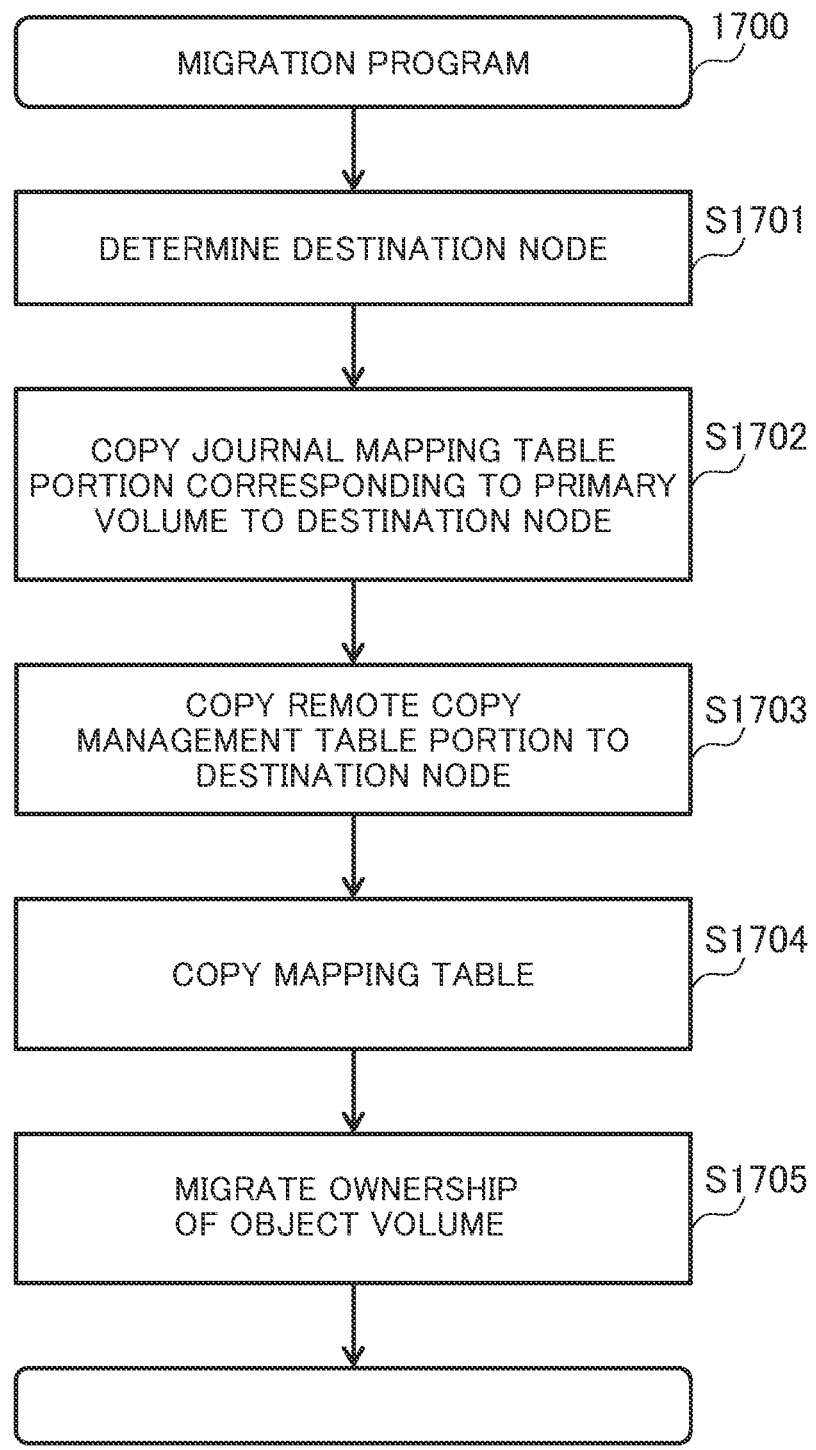
FIG. 17 illustrates one example of a procedure of processing executed by a migration program to migrate a primary volume according to the embodiment of the invention.
Figure 24:
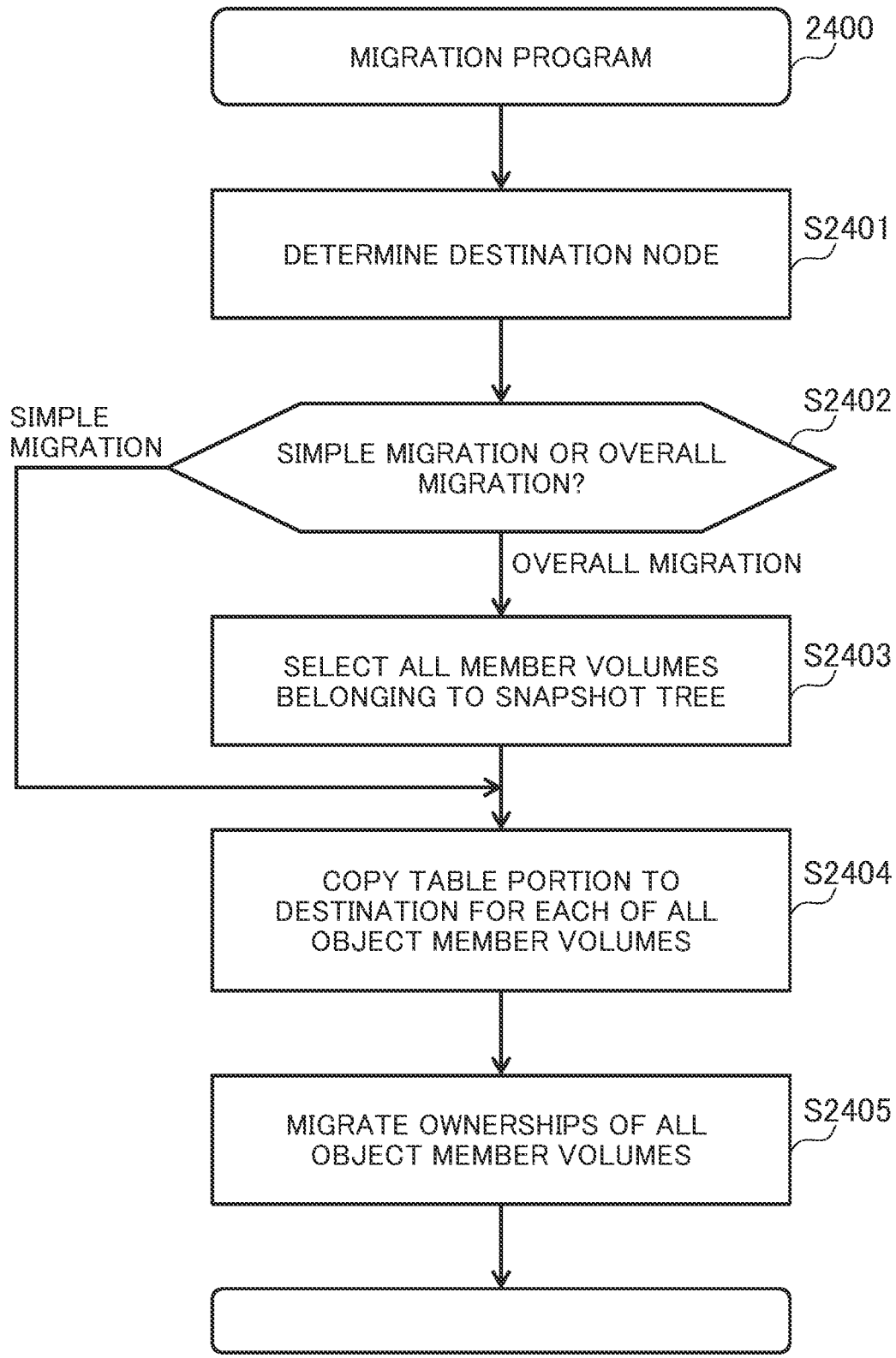
FIG. 24 illustrates one example of a procedure of processing executed by a migration program to migrate a member volume according to the embodiment of the invention.
Figure 27:
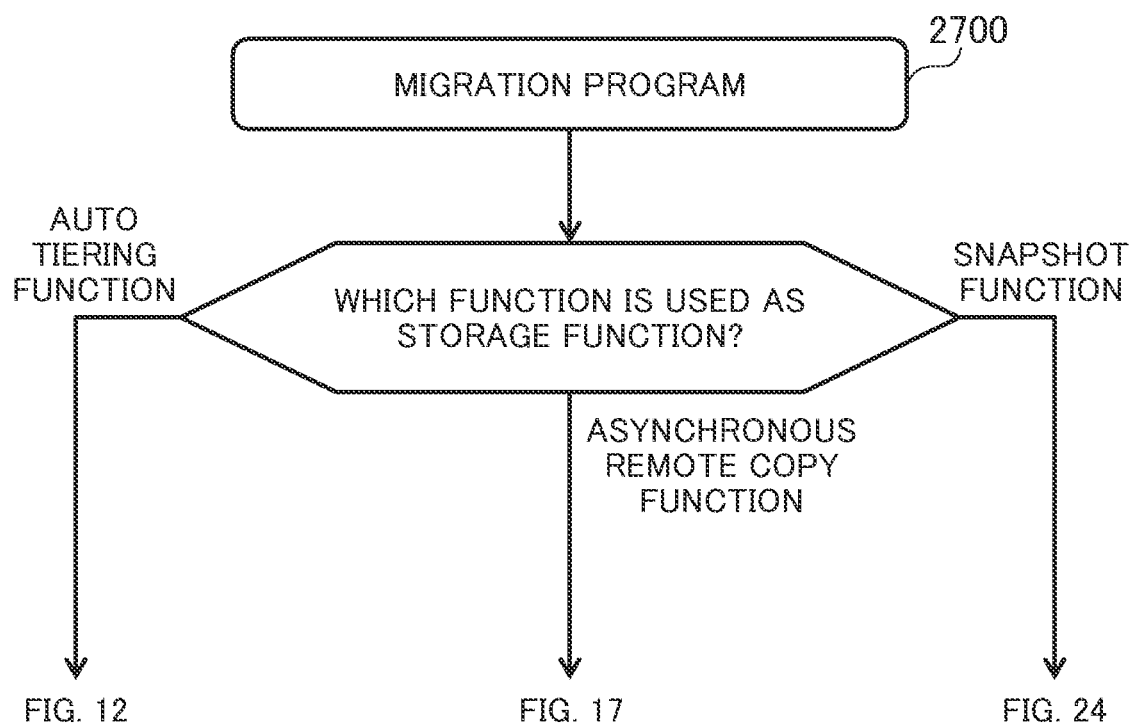
FIG. 27 illustrates an outline of storage function discrimination and results of the discrimination according to the embodiment of the invention.

As illustrated in FIG. 27, a migration program 2700 identifies a storage function applied to a volume specified as a migration object. According to a result of such identification, the migration program 2700 determines a volume to be a migration object, in addition to control data to be copied to a destination server and a specified storage owner volume (a volume of which the ownership is owned by a source server and to which the storage function is applied). For example, when the storage function is the auto tiering function, the migration program 2700 performs processing as illustrated in FIG. 12. When the storage function is the asynchronous remote copy function, the migration program 2700 performs processing as illustrated in FIG. 17. When the storage function is the snapshot function, the migration program 2700 performs processing as illustrated in FIG. 24. Consequently, ownership of a volume can be promptly migrated between the servers 101 (volume migration) without copying data written to the migration object volume between the servers 101 while maintaining functionality of the storage function appropriately depending on a type of the storage function.

The storage function is now classified for detailed description of this embodiment. In the following description, a source server is referred to as "server 101A" while a destination server is referred to as "server 101B" for ease of explanation. In the following description, the source server 101A is typically exemplified.

Case of Storage Function Being Auto Tiering Function

Figure 9:
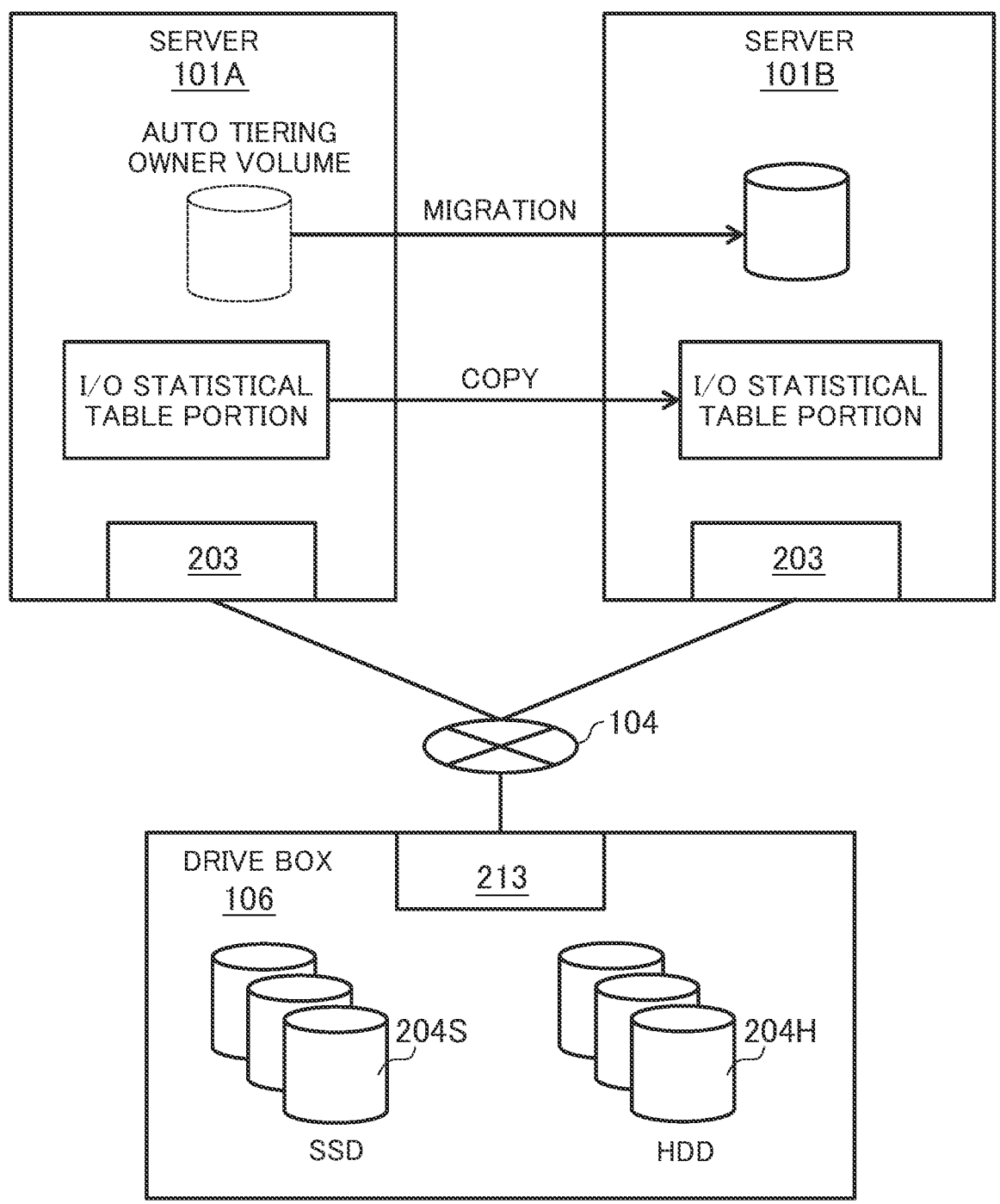
FIG. 9 illustrates an outline of an exemplary migration of an auto tiering owner volume according to the embodiment of the invention.

FIG. 9 illustrates an outline of an exemplary migration of an auto tiering owner volume.

The term "auto tiering owner volume" means a storage owner volume to which the auto tiering function is applied (volume of which the ownership is owned by the server 101A and to which the storage function is applied). The auto tiering function is a storage function of performing auto tiering on the storage owner volume of the server 101A. The term "auto tiering" means that a drive 204 as a location destination of data written to a volume region is changed depending on an I/O frequency of the volume region at regular intervals or every time a predetermined event occurs.

Specifically, the auto tiering function is the following function: when multiple types of drives 204 having different I/O performances, such as SSD 204S and HDD 204H, exist in the drive box 106, on the basis of an I/O frequency of a volume region (page allocated to the volume region) of each volume, data in that page is relocated in a page based on an appropriate drive 204 for the I/O frequency of the volume region to optimize cost performance of the entire distributed storage system.

In a configuration of a distributed storage system, in which each server 101 manages only a volume the ownership of which is owned by the server 101 itself, information indicating I/O statics (statics of I/O frequencies) of each volume, to which the auto tiering function is applied, is owned only by an owner server 101 of that volume. In such a configuration, while update of an I/O statistical table portion (part of a table showing the I/O statics) or relocation necessity determination based on the I/O statistical table portion can be immediately performed at low cost, when a volume is migrated to another server 101, such a I/O statistical table portion (collection of records corresponding to the volume as a migration object) is also necessary to be appropriately copied. When that I/O statistical table portion is not copied, a destination server 101 must collect I/O statics again to determine an appropriate drive, which temporarily impairs functionality.

In the example shown in FIG. 9, a plurality of SSDs 204S and a plurality of HDDs 204H are located in the drive box 106. Each server 101 uses, for each volume, an I/O statistical table portion (one example of I/O statistical data) corresponding to the volume to appropriately relocate data in the SSD 204S or the HDD 204H.

However, location of the drive 204 usable in this embodiment is not limited to this. For example, in a usable configuration, a type of drive 204 (for example, SSD 204S) is located in the drive box 106, while another type of drive 204 (for example, HDD 204H) is a built-in drive of the server 101. In another usable configuration, respective different types of drives 204 are located in different drive boxes 106. Although SSD and HDD are each used as a drive type in this embodiment, all types of drives having different I/O performances may be used in case of using the auto tiering function. For example, auto tiering can be performed between a NVMe device and a serial ATA (SATA) SSD device in a configuration. Further, although auto tiering between two types of drives is exemplified in this embodiment, the same effects can be exhibited in case of auto tiering between three or more types of drives.

FIG. 10 illustrates an exemplary configuration of an I/O statistical table 1000.

The server 101A holds an I/O statistical table 1000 in the memory 202 of the server 101A. The I/O statistical table 1000 has a record (I/O statistical record) for each volume. Each record holds information, including a volume #1001, a page-within-volume #1002, IOPS 1003, and a hierarchy determination result 1004. One volume is exemplified ("object volume" in description of FIG. 10).

The volume #1001 indicates an identifier of an object volume. The page-within-volume #1002 indicates an identifier of a page within an object volume (volume region corresponding to size of a page in an object volume). The IOPS 1003 indicates I/O per second (IOPS) as one example of I/O frequency in a page within an object volume, specifically indicates IOPS of the page within the object volume, which is calculated from the number of I/O received by the page within the object volume for a certain period in the past. The hierarchy determination result 1004 indicates a type of a drive 204 appropriate as a location destination of data within a page allocated to the page within the object volume. IOPS can be acquired by a typical method.

Figure 11:
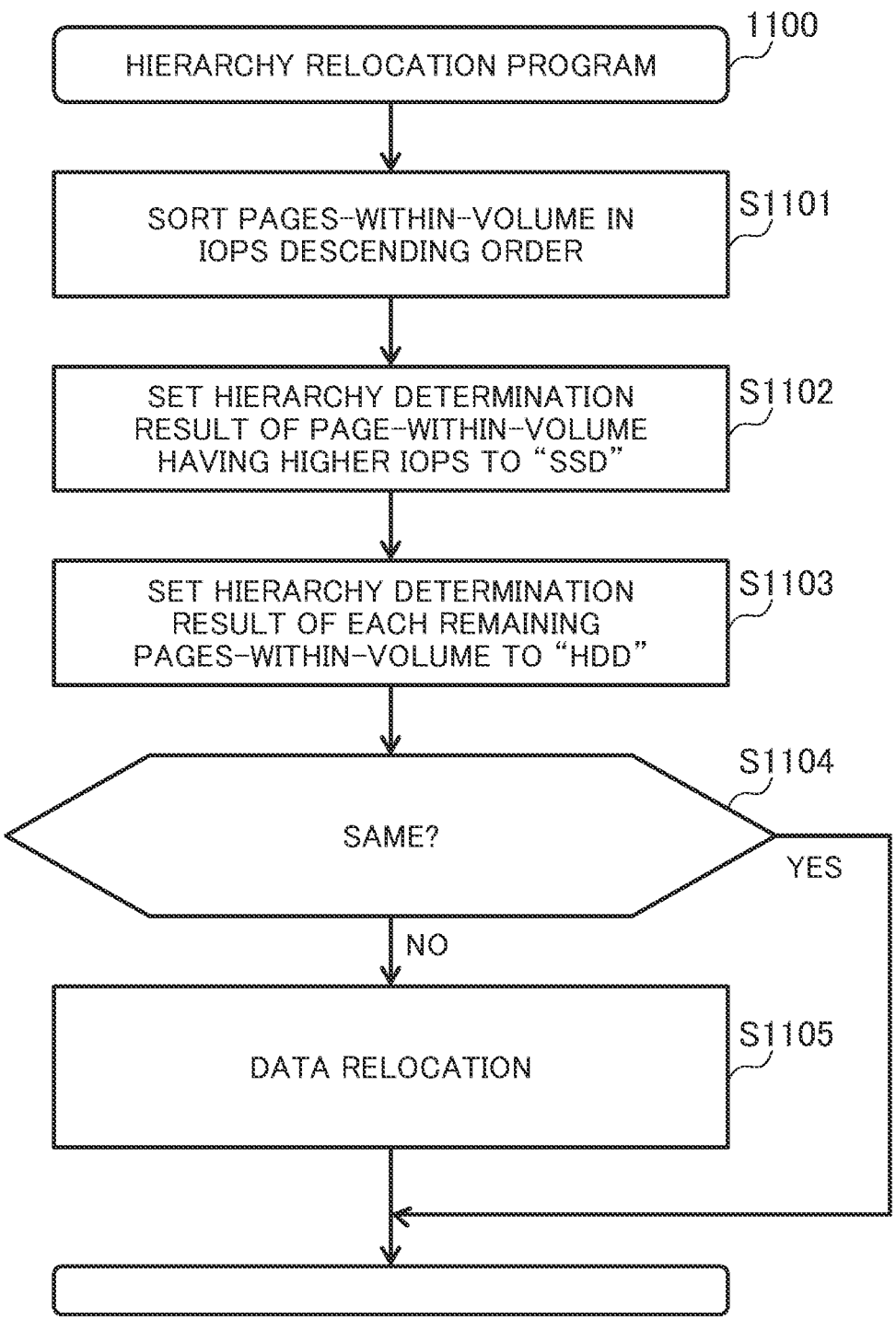
FIG. 11 illustrates one example of a procedure of processing executed by a hierarchical redistribution program according to the embodiment of the invention.

FIG. 11 illustrates one example of a procedure of processing executed by the hierarchical redistribution program 1100.

The hierarchical redistribution program 1100, based on IOPS of each page-within-a-volume of a volume, determines a drive type of an appropriate location destination of data in a page allocated to the page within the volume, and can perform relocation of data between the drives 204 as necessary. One auto tiering owner volume in the server 101A is exemplified in description of FIG. 11.

The hierarchy relocation program 1100 regularly executes the processing exemplified in FIG. 11. First, the hierarchy relocation program 1100 specifies IOPS of all pages-within-volume of an auto tiering owner volume from all records corresponding to the auto tiering owner volume in the I/O statistical table 1000, and sorts the pages-within-volume in descending order of IOPS (S1101).

The maximum number of SSD pages (pages based on the SSD 204S) allocatable to a relevant server 101 is assumed to be determined for each server 101. The hierarchy relocation program 1100 is assumed to allocate SSD pages within a range of the maximum number of SSD pages beforehand allocated to the own server 101 (server 101A) in descending order of IOPS, and thus sets a hierarchy determination result 1004 of the page-within-volume, to which the SSD page is to be allocated, to "SSD" (1102). The hierarchy relocation program 1100 sets the hierarchy determination result 1004 to "HDD" for each page-within-volume other than the respective pages-within-volume, to which the SSD pages corresponding to the maximum number of SSD pages are to be allocated (S1103). That is, a HDD page (page based on the HHD 204H) is allocated to a page-within-volume to which the SSD page is not allocated.

Finally, the hierarchy relocation program 1100 determines, for each page-within-volume of the auto tiering owner volume, whether a type of the drive 204 as a base of a page allocated to the page-within-volume is the same as a drive type indicated by the hierarchy determination result 1004 based on the page mapping table 700A (S1104).

The hierarchy relocation program 1100 performs data relocation for a page-within-volume of which the determination result of S1104 is untrue (S1105). Specifically, the hierarchy relocation program 1100 reads data from a page allocated to such a page-within-volume, writes the page to a page based on a drive of the drive type indicated by the hierarchy determination result 1004, and allocates such a destination page to the page-within-volume (updates the page mapping table 700A). Consequently, for example, when a page in which the data is stored is an SSD page, and when the hierarchy determination result 1004 is "HDD", data in such a SSD page is relocated in a HDD page.

Such data relocation is unnecessary for a page-within-volume of which the determination result of S1104 is true.

FIG. 12 illustrates one example of a procedure of processing executed by the migration program 2700 to migrate the auto tiering owner volume.

The migration program 2700 can migrate, for a specified auto tiering owner volume, ownership between the servers 101 without data copy while maintaining functionality of the auto tiering function.

The migration program 2700 first determines a destination server 101 of the specified auto tiering owner volume (S1201). At this time, for a migration object volume, the destination server 101 may preferentially select a server 101, in which empty pages the number of which is similar to the sum of the total number of pages, of each of which the hierarchy determination result 1004 is "SSD", and the total number of pages, of each of which the hierarchy determination result 1004 is "HDD", (the number of empty pages similar to the maximum number of allocatable pages for each drive type). The server 101B is assumed to be selected as the migration object volume.

Subsequently, the migration program 2700 copies a table portion (record group) corresponding to a migration object volume (specified auto tiering owner volume) in the page mapping table 700A to the destination server 101B, and copies a table portion (record group) corresponding to a migration object volume in the I/O statistical table 1000 to the destination server 101B (S1202). The migration program 2700 migrates the ownership of the migration volume from the server 101A to the server 101B (S1203).

As described above, with the auto tiering owner volume, the I/O statistical table portion corresponding to that volume is copied to the destination server 101B. As a result, the destination server 101B can reduce warmup time required for determining an appropriate drive type (time for acquiring appropriate I/O frequency statics) for each page-within-volume of a volume migrated to the server 101B and migrate the ownership of the volume without copying data written to the volume between the servers 101 while maintaining functionality of auto tiering.

Case of Storage Function Being Asynchronous Remote Copy Function

Figure 13:
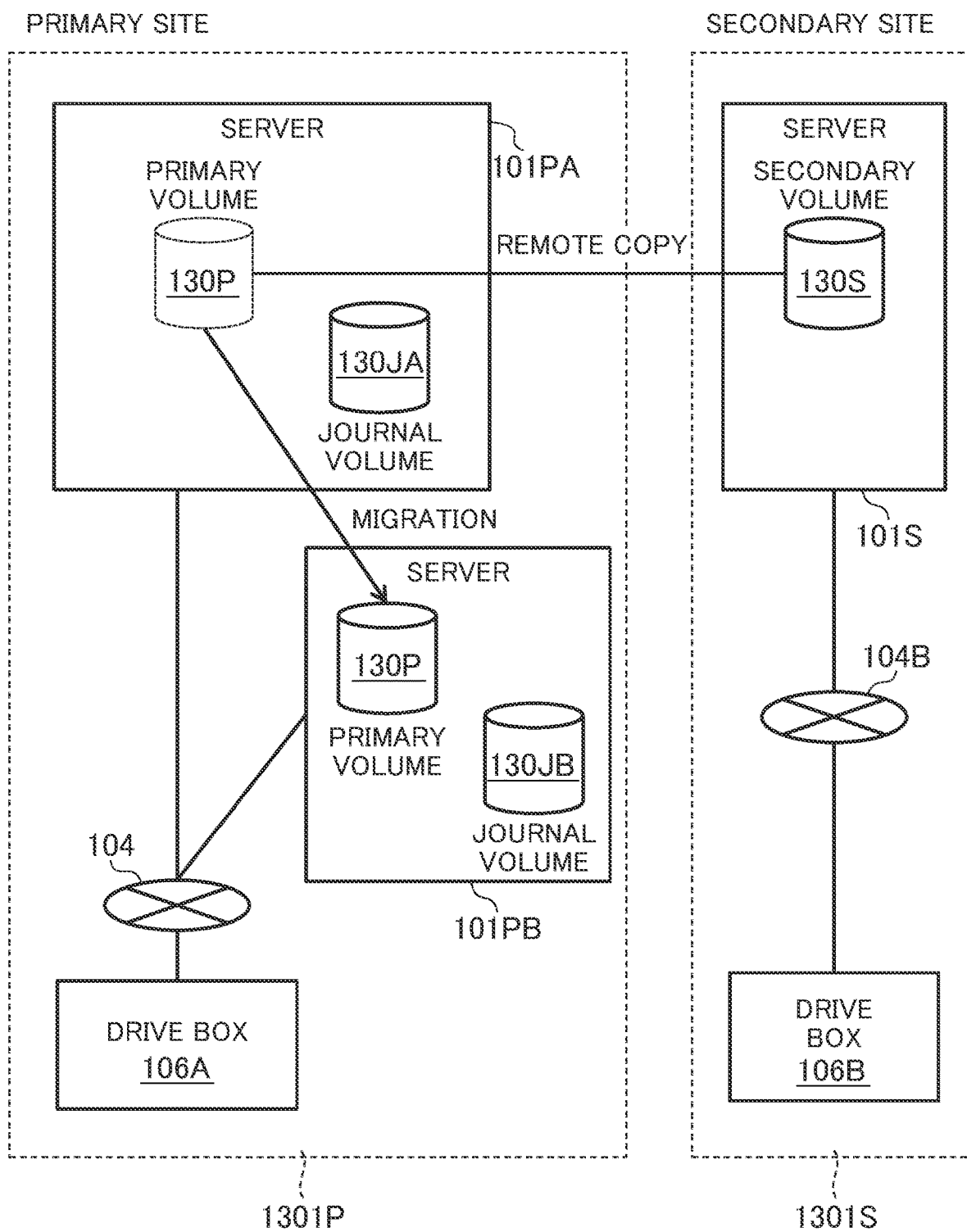
FIG. 13 illustrates an outline of an exemplary migration of a primary volume according to the embodiment of the invention.

FIG. 13 illustrates an outline of exemplary migration of a primary volume.

The remote copy function creates a duplication of a volume on a primary site 1301P in a server 101 of another storage cluster on a secondary site 1301S. A plurality of volume duplications can be created in servers 101 of different storage clusters. The term "primary volume" means a copy source volume, and "secondary volume" means a copy destination volume. For example, in the primary site 1301P, a plurality of servers 101P are connected to the drive box 106A via a network 104A. Similarly, in the secondary site 1301S, a plurality of servers 101S are connected to the drive box 106B via a network 104B.

The remote copy function includes "synchronous remote copy function" meaning that when a write request to a primary volume 130P occurs, data is written to both the primary volume 130P and a secondary volume 130S and then a response is returned to the write request, and "asynchronous remote copy function" meaning that data is written to the primary volume 130P and then a response is returned to the write request regardless of the data being written to the secondary volume 130S. Herein, the asynchronous remote copy function is focused. In the asynchronous remote copy function, a journal containing data to be written to the secondary volume on the secondary site 1301S is written into a so-called buffer region called journal volume 130J, and then the data is transferred to the secondary site 1301S asynchronously to processing of the write request.

In a distributed storage system in which each server 101 manages only a volume the ownership of which is owned by the server 101 itself, the server 101A needs to migrate the primary volume 130P, to which the asynchronous remote copy function is applied, to the server 101B while maintaining functionality of the asynchronous remote copy function without data copy between the servers 101. To this end, the server 101B needs to succeed from the server 101A the journal containing the data written to the primary volume 130P and transfer the data in the journal to a server 101S having the secondary volume 130S (server 101S on the secondary site 1301S).

In this embodiment, each server 101 has one or more journal volumes 130J. The server 101 stores a journal, which contains data written to a primary volume the ownership of which is owned by the server 101 itself, in the journal volume 130J of the server 101. With the journal volume 130J, a relationship between a volume region (page-within-volume) and a page is managed by the page mapping table as shown in FIG. 7A, and the journal is stored in a drive within the drive box 106A. The journal written to the journal volume 130JA (journal written to a drive through the journal volume 130JA) can be read from the server 101A having the ownership of the journal volume 130JA. In other words, such a journal cannot be read from a server 101 having no ownership of the journal volume 130JA.

FIG. 14 illustrates an exemplary configuration of a remote copy management table 1400.

The server 101A holds the remote copy management table 1400 in the memory 202 of the server 101A. The remote copy management table 1400 is one example of remote copy management data indicating a relationship between the primary volume and the secondary volume, and has a record for each primary volume. Each record holds information, including a primary volume #1401, a storage cluster #1402, a server #1403, a secondary volume #1404, a remote copy state 1405, and a journal volume #1406. One primary volume is exemplified ("object primary volume" in description of FIG. 14).

The primary volume #1401 indicates an identifier of the object primary volume.

The storage cluster #1402, the server #1403, and the secondary volume #1404 each show an identifier of a secondary volume pairing with the object primary volume. Specifically, the storage cluster #1402 shows an identifier of a storage cluster (volume group) containing the object primary volume. The server #1403 shows an identifier of a server having a secondary volume pairing with the object primary volume. The secondary volume #1404 shows an identifier of a secondary volume in a storage cluster containing the object primary volume.

The remote copy state 1405 indicates a state of remote copy in the pair of the object primary volume and the secondary volume. The remote copy state 1405 shows values including "Copy" (meaning that copy is being performed), "Pair" (meaning that copy is completed), and "Suspend" (meaning that copy is suspended).

The journal volume #1406 indicates an identifier of a journal volume with which the object primary volume is associated (journal volume as a write destination of a journal containing data to be written to the object primary volume).

FIG. 15 illustrates an exemplary configuration of a journal mapping table 1500.

The server 101A holds the journal mapping table 1500 (one example of journal mapping data) in the memory 202 of the server 101A for each journal volume 130JA owned by the server 101A. One journal volume 130JA is exemplified.

The journal mapping table 1500 manages which secondary volume address on the secondary site a journal written to the journal volume 130JA is to be written to. The journal mapping table 1500 has a record for each volume region configuring the journal volume 130J. Each record holds information including a volume region #1501, a secondary volume #1502, a reflection destination address 1503, and a transfer state 1504. One volume region is exemplified ("object volume region" in description of FIG. 15).

The volume region #1501 indicates an identifier (address) of the object volume region. The secondary volume #1502 indicates an identifier of a secondary volume as a reflection destination of the journal stored in the object volume region, and the reflection destination address 1503 indicates an address of a volume region in the secondary volume. In place of or in addition to the secondary volume #1502 and the reflection destination address 1503, an identifier of a primary volume, in which data containing a journal written to the object volume region is written, and an address of a write destination volume region in the primary volume may be stored in the journal mapping table 1500. A reflection destination (copy destination) of data in the journal written to the object volume region may be specified from an identifier of a primary volume, an address of a write destination volume region in the primary volume, and the remote copy management table 1400.

The transfer state 1504 indicates a state of the object volume region. Values of the transfer state 1504 include "invalid", "valid", "handover/server identifier", and "proxy/server identifier". The term "invalid" means a state (empty state) where a journal can be written to the object volume region. The term "valid" means a state where a journal has been written to the object volume region, and data in the journal should be transferred to a secondary volume. The term "handover/server identifier" means a state where reflection of a journal written to the object volume region is handed over to a server 101 of the server identifier. The term "proxy/server identifier" means a state where reflection of a journal written to the object volume region is handed over from the server 101 of the server identifier.

Here, "reflection of a journal", may mean that a journal containing data written to a primary volume (for example, data in the journal) is transmitted to a computer having a secondary volume paring with the primitive volume, specifically, for example, may mean that the data in the journal is written to a secondary volume, or the journal is transmitted to a computer having a secondary volume and the computer stores the journal to a journal volume of the computer and writes the data in the journal to the secondary volume, or the computer receives the data in the journal and writes the data to the secondary volume. The journal may contain not only the data written to the primary volume, but also journal metadata (for example, data containing information, such as sequence number or timestamp, by which write order can be specified). The data in the journal may be written to the secondary volume in the write order of journals.

Figure 16:
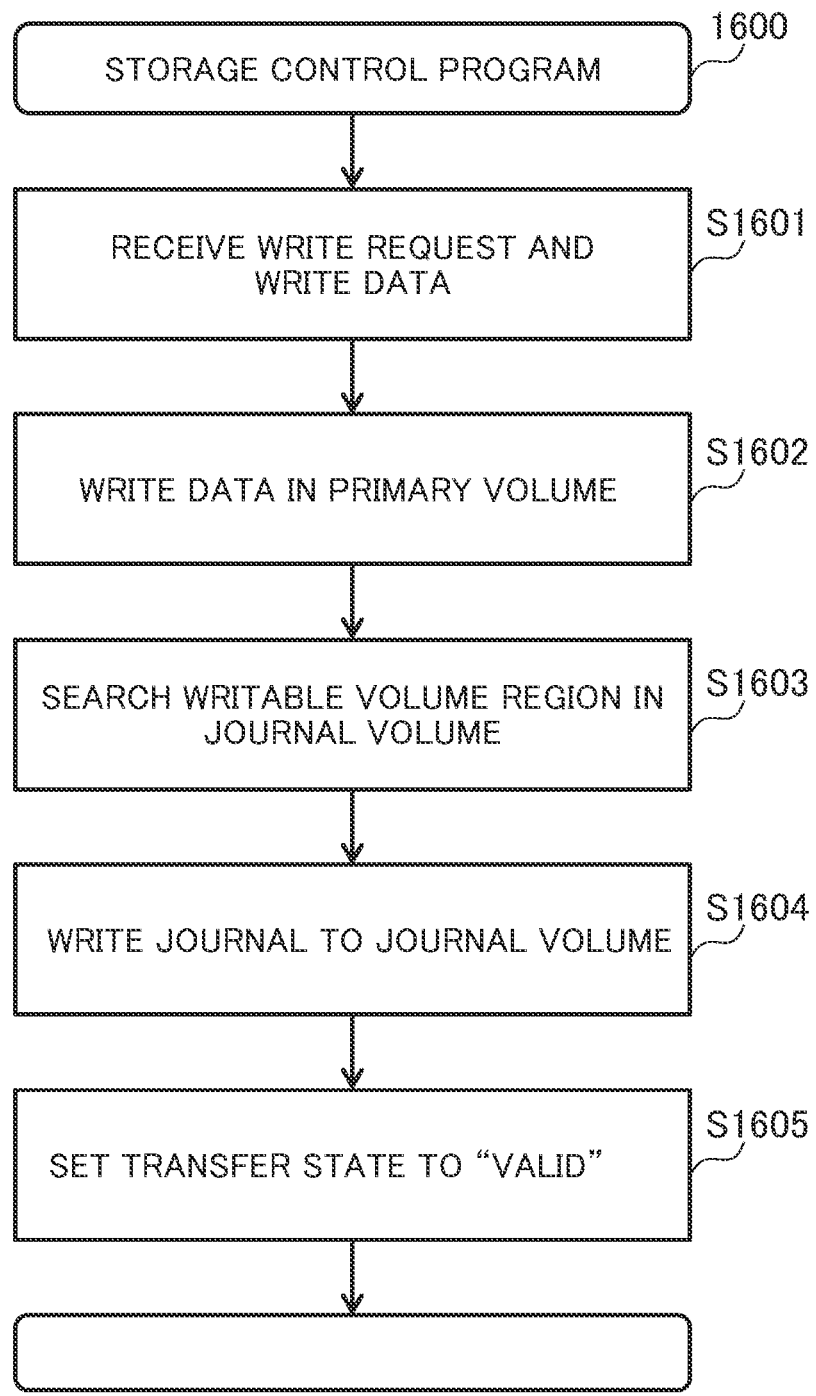
FIG. 16 illustrates one example of a procedure of processing executed by a storage control program according to the embodiment of the invention.

FIG. 16 illustrates an example of a procedure of processing executed by the storage control program 103A.

The storage control program 103A can store the received write data in the primary volume 130P and create a journal containing such data.

The storage control program 103A receives a write request to the primary volume 130P and write data (S1601). The storage control program 103A refers to the page mapping table 700A, and writes the received write data to a drive as a base of a page corresponding to a volume region as a write destination (S1602).

Subsequently, the storage control program 103A refers to the remote copy management table 1400, and searches the journal volume 130J corresponding to the primary volume 130P of a write destination (S1603). The storage control program 103A refers to a journal mapping table 1500 corresponding to a found journal volume 130J and searches a record of a transfer state 1504 "invalid" (writable volume region) (S1604). The storage control program 103A writes a journal containing data written in S1602 to a found volume region (S1605).

Finally, the storage control program 103A updates the journal mapping table 1500 referred in S1604, specifically writes "valid" into the transfer state 1504 of a record corresponding to the found volume region (S1606).

FIG. 17 illustrates an example of a procedure of processing executed by the migration program 2700 to migrate the primary volume 130P.

The migration program 2700 can migrate the ownership of the specified primary volume between the servers 101 without data copy between the servers 101 while maintaining functionality of the asynchronous remote copy function.

The migration program 2700 first determines a destination server 101 of the specified primary volume 130P (S1701). For example, the destination server 101 is determined from a server in the primary site 1301P in which the server 101A having the ownership of the primary volume 130P exists. For example, the server 101B is determined as the destination server.

Subsequently, the migration program 2700 specifies a volume region (region within a journal volume), in which a journal containing the data written to the primary volume 130P is written, based on the remote copy management table 1400 and/or the journal mapping table 1500, and copies a journal mapping table portion (a record group of the journal mapping table 1500, one example of region control data) corresponding to the specified volume region to a journal mapping table of the destination server 101B (S1702).

The migration program 2700 copies a record (remote copy management portion), which corresponds to the primary volume 130P as a migration object, in the remote copy management table 1400 to the destination server 101B (S1703).

The migration program 2700 copies a page mapping table portion, which corresponds to the primary volume as a migration object (and a volume region indicated by the journal mapping table portion copied in S1702), in the page mapping table 700A to the destination server 101B (S1704), and migrates the ownership of the primary volume 130P as the migration object to the server 101B (S1705).

In S1702, the migration program 2700 writes the transfer state 1504 "handover/server 101B identifier" to a source record (record of the journal mapping table 1500), and writes the transfer state 1504 "proxy/server 101A identifier" to a destination record (record of the journal mapping table 1500 of the destination server 101B). Consequently, the authority to reflect a journal is handed over from the server 101A to the server 101B, and the server 101B reflects the journal by proxy of the server 101A.

Figure 18:
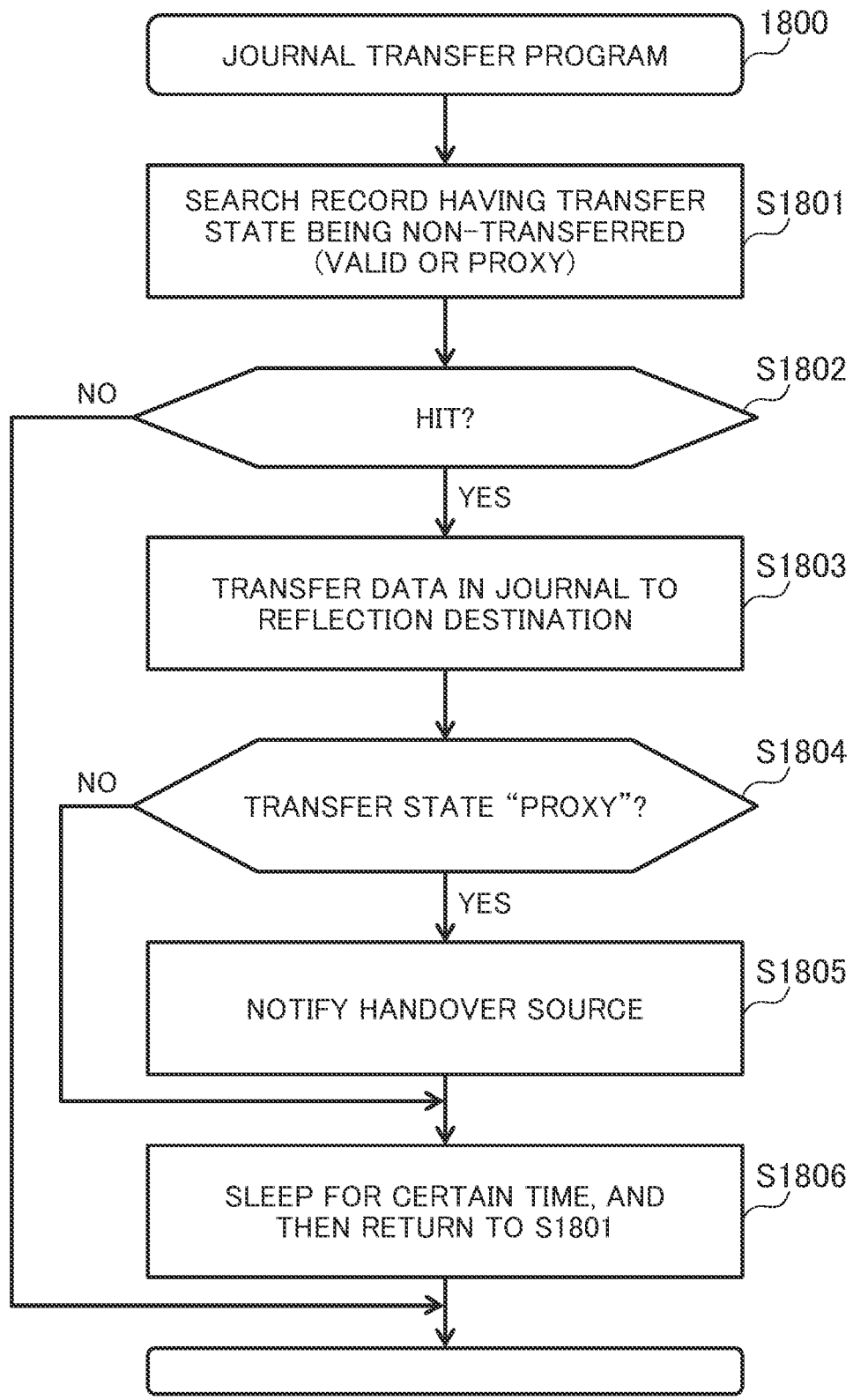
FIG. 18 illustrates one example of a procedure of processing executed by a journal transfer program according to the embodiment of the invention.

FIG. 18 illustrates an example of a procedure of processing executed by the journal transfer program 1800.

The journal transfer program 1800 can refer to the transfer state 1504 of a journal region of a journal volume and reflect (transfer) an unreflected journal to a server 101 as a reflection destination. This program 1800 is executed asynchronously to processing performed in response to reception of a write request, and is continuously executed until any unreflected journal is eliminated (until the transfer state 1504 becomes "invalid" in any volume region in the journal volume), for example.

The journal transfer program 1800 first refers to the journal mapping table 1500, and searches a record in which the transfer state 1504 is a non-transferred state ("valid" or "proxy") (S1801). If a record is found (S1802: YES), processing is passed to S1803. If no record is found (S1802: NO), processing is ended.

Subsequently, the journal transfer program 1800 reads a journal from a volume region (volume region in the journal volume 130JA) indicated by the found record, and transfers the data in the journal to a reflection destination (the storage cluster #1402, the server #1403) indicated by the record while designating a secondary volume #1404 and a reflection destination address (address specified from the journal mapping table 1500) (S1803). At this time, when the transfer state 1504 indicated by the record is "proxy/server identifier" (S1804: YES), the journal transfer program 1800 transmits a transfer completion notice designating a volume region #1501 indicated by the record to a server 101 (server 101 of that server identifier) as a handover source of the journal (S1805).

Upon reception of the transfer completion notice, the handover source server 101 sets "invalid" to the transfer state 1504 in a record of the volume region #1501 designated by the transfer completion notice.

The journal transfer program 1800 cancels the record that has been transferred (sets the transfer state 1504 of that record to "invalid"), and sleeps for a certain time (S1806). When another record, of which the transfer state 1504 is "valid" or "proxy", exists, the journal transfer program 1800 performs S1801 on that record.

As described above, with a primary volume to which the asynchronous remote copy function is applied, location information (journal mapping table portion) of temporary buffer data (journal) to be reflected to the secondary volume is copied between the servers 101. Even if a source server has the ownership of a journal volume in which the journal is stored, the authority of read and reflection (transfer) of a journal, which contains data written to a migrated primary volume, is handed over to a destination server of the primary volume. In place of the source server, the destination server can read such a journal and reflect the journal based on the copied journal mapping table portion (based on the handed-over authority) through a journal volume of the destination server. As a result, the ownership of the primary volume can be migrated between the servers 101 without copy of data written to the primary volume as a migration object between the servers 101 while maintaining functionality of the asynchronous remote copy function. Further, since the transfer completion notice, which specifies a volume region # of the reflected journal, is transmitted from the destination server to the source server, the source server can release a record of the transfer state 1504 "handover" to a record of the transfer state 1504 "invalid".

Case of Storage Function Being Snapshot Function

Figure 19:
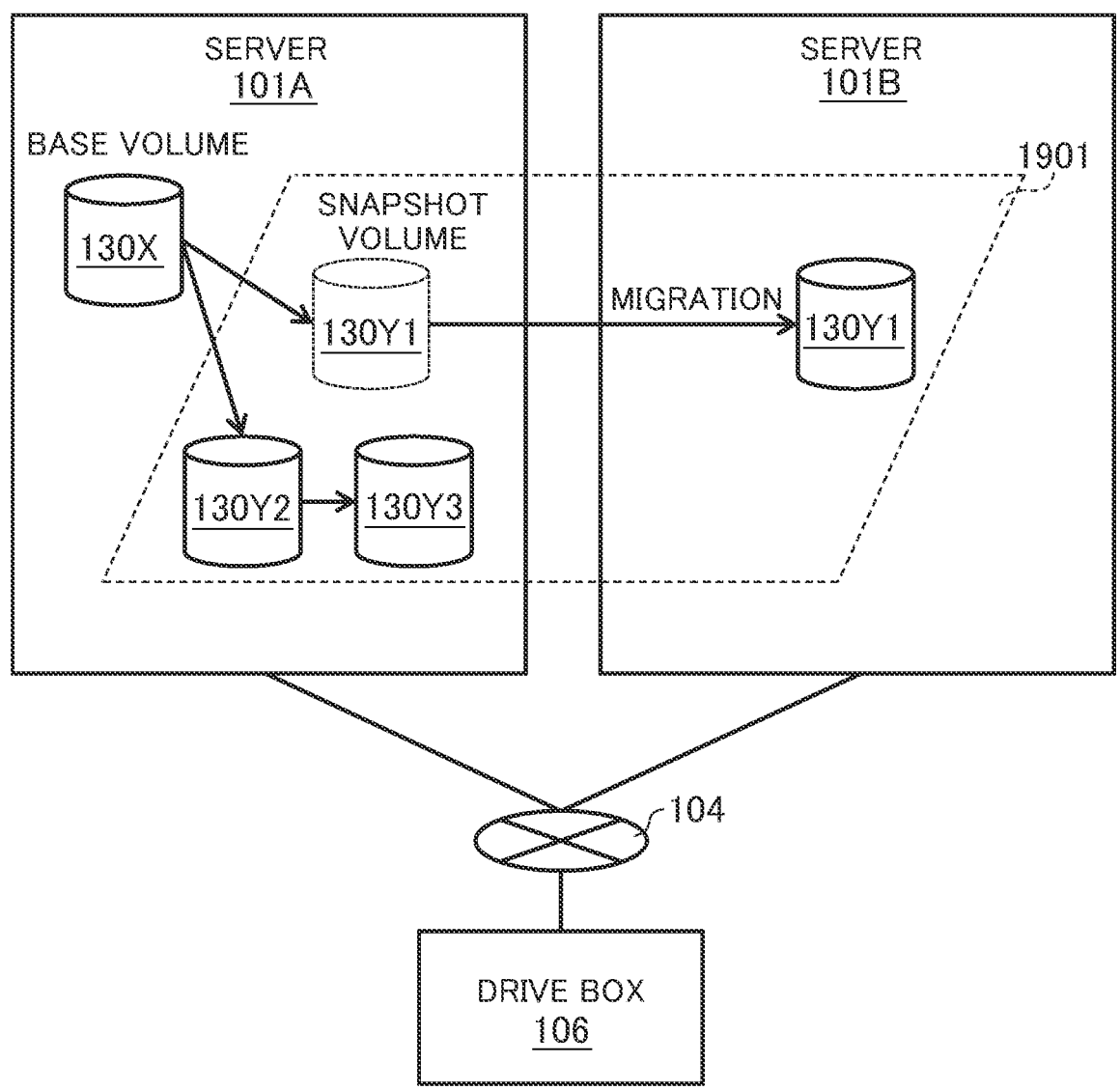
FIG. 19 illustrates an outline of an exemplary migration of a member volume according to the embodiment of the invention.

FIG. 19 illustrates an outline of an exemplary migration of a member volume.

The snapshot function is to acquire duplicate (snapshot) of a volume at a past certain time. The snapshot function manages a difference between data at the present time and data at the snapshot acquisition time of an acquisition source volume (parent volume) of a snapshot. The snapshot data can read/write from/to a host or the like as a volume (snapshot volume being a volume as a snapshot of the parent volume) different from the parent volume of the snapshot.

In the example of FIG. 19, the server 101A can acquire a plurality of snapshot volumes 130Y (for example, 130Y1 and 130Y2) assuming an owner volume (a volume the ownership of which is owned by the server 101A) is a base volume 130X. The server 101A can further acquire a snapshot volume 130Y3 from the acquired snapshot volume 130Y2. As a result, the inter-relation (configuration) of a volume group 1901 including the base volume 130X and one or more snapshot volumes 130Y can be represented in a form of a tree structure (snapshot tree), in which one or more snapshot volumes are each a node (intermediate node or leaf node) other than a root node while the base volume is defined as the root node. The snapshot volume 130Y can be subjected to snapshot operation or restoration operation depending on a snapshot state. In this embodiment, "member volume" means a volume corresponding to a node in the snapshot tree, i.e., the base volume 130X or the snapshot volume 130Y. In the snapshot tree, the base volume (volume corresponding to the root node) is a volume as a direct or indirect base of one or more snapshot volumes.

In a configuration of the distributed storage system in which each server 101 manages only a volume the ownership of which is owned by the server 101 itself, differential data (differential data between the snapshot volume and the parent volume) managed by the snapshot function and address information (information indicating a relationship between a volume region in a snapshot volume and a region as a reference destination of the volume region), i.e., control data (metadata) on the base volume 130X or the snapshot volume 130Y are owned only by the owner server 101. In such a configuration, another server 101 cannot refer to such control data (for example, the differential information and the address information). In one comparative example, therefore, if ownership of some snapshot volume is migrated between servers, while the ownership of the snapshot volume is owned by a destination server, the ownership of a volume as a reference destination of that snapshot volume is owned by a source server, and thus the snapshot volume cannot be restored. As described above, migration of ownership of a snapshot volume between servers impairs functionality of the snapshot function. This embodiment makes it possible to solve such a problem, i.e., to migrate the ownership of the snapshot volume between servers 101 while maintaining functionality of the snapshot function.

FIG. 20 illustrates an exemplary configuration of a snapshot management table 2000.

The server 101A holds the snapshot management table 2000 in the memory 202 of the server 101A. The snapshot management table 2000 is one example of snapshot management data, and indicates a snapshot tree (i.e., dependencies between member volumes). The snapshot management table 2000 has a record for each member volume. Each record holds information including a volume #2001, a parent volume #2002, snapshot time 2003, and a snapshot state 2004. One member volume is exemplified ("object member volume" in description of FIG. 20).

The volume #2001 indicates an identifier of an object member volume. The parent volume #2002 indicates an identifier of a parent volume of the object member volume (volume of a snapshot acquisition source). A member volume for the parent volume (snapshot of the parent volume) is a child volume. The snapshot time 2003 indicates time at which a snapshot as the object member volume is created. The snapshot state 2004 indicates a state of the snapshot as the object member volume. A value of the snapshot state 2004 includes "being acquired" (meaning that a snapshot is being acquired) or "acquired" (meaning that a snapshot has been acquired).

FIG. 21 illustrates an exemplary configuration of a snapshot mapping table 2100.

The snapshot mapping table 2100 is one example of snapshot mapping data, and indicates a correspondence relationship between a volume and snapshot data (data as a volume snapshot). The snapshot mapping table 2100 has a record for each volume region in the snapshot volume. Each record holds information including a volume #2101, an address-within-volume 2102, a storage device #2103, and an address-within-storage device 2104. One volume region is exemplified ("object volume region" in description of FIG. 21).

The volume #2101 indicates an identifier of a snapshot volume containing the object volume region. The address-within-volume 2102 indicates an address of the object volume region. The storage device #2103 indicates an identifier of a storage device having a reference destination region of the object volume region (parent volume, volume higher than the parent volume, or drive 214). The address-within-storage device 2104 indicates an address (volume region address or page address) of the reference destination region of the object volume region.

Figure 22:
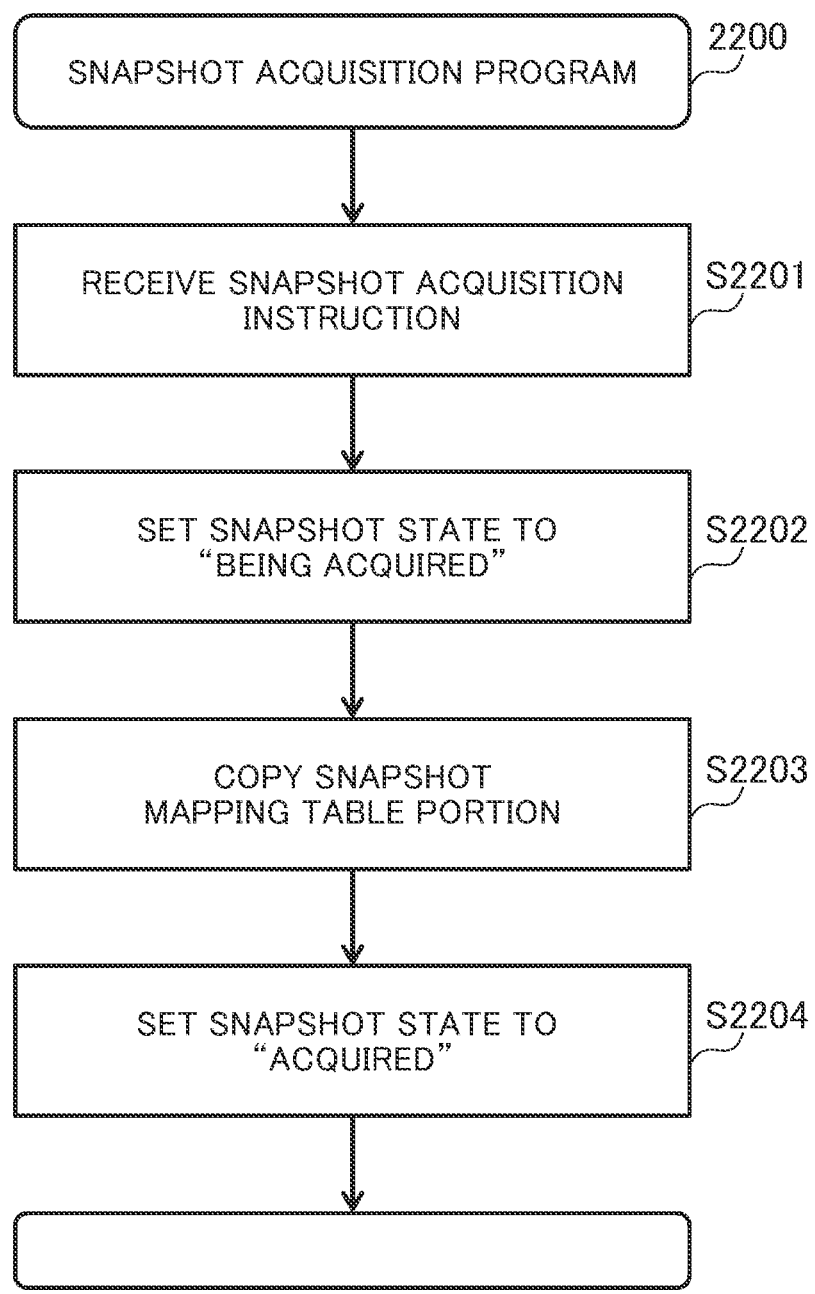
FIG. 22 illustrates an example of a procedure of processing executed by a snapshot acquisition program according to the embodiment of the invention.

FIG. 22 illustrates an example of a procedure of processing executed by the snapshot acquisition program 2200.

The snapshot acquisition program 2200 can acquire a snapshot on a specified volume.

First, upon receiving a snapshot acquisition request (S2201), the snapshot acquisition program 2200 adds a record, of which the parent volume is the specified volume, to the snapshot management table 2000, and sets the snapshot state 2004 of the record to "being acquired" (S2202).

Subsequently, the snapshot acquisition program 2200 copies a snapshot mapping table portion (record group) corresponding to the parent volume of the specified volume (S2203). That is, a reference destination of a volume region in the specified volume is a volume region in the parent volume. Finally, the snapshot acquisition program 2200 sets the snapshot state 2004 of the added record in the snapshot management table 2000 to "acquired" (S2204).

Figure 23:
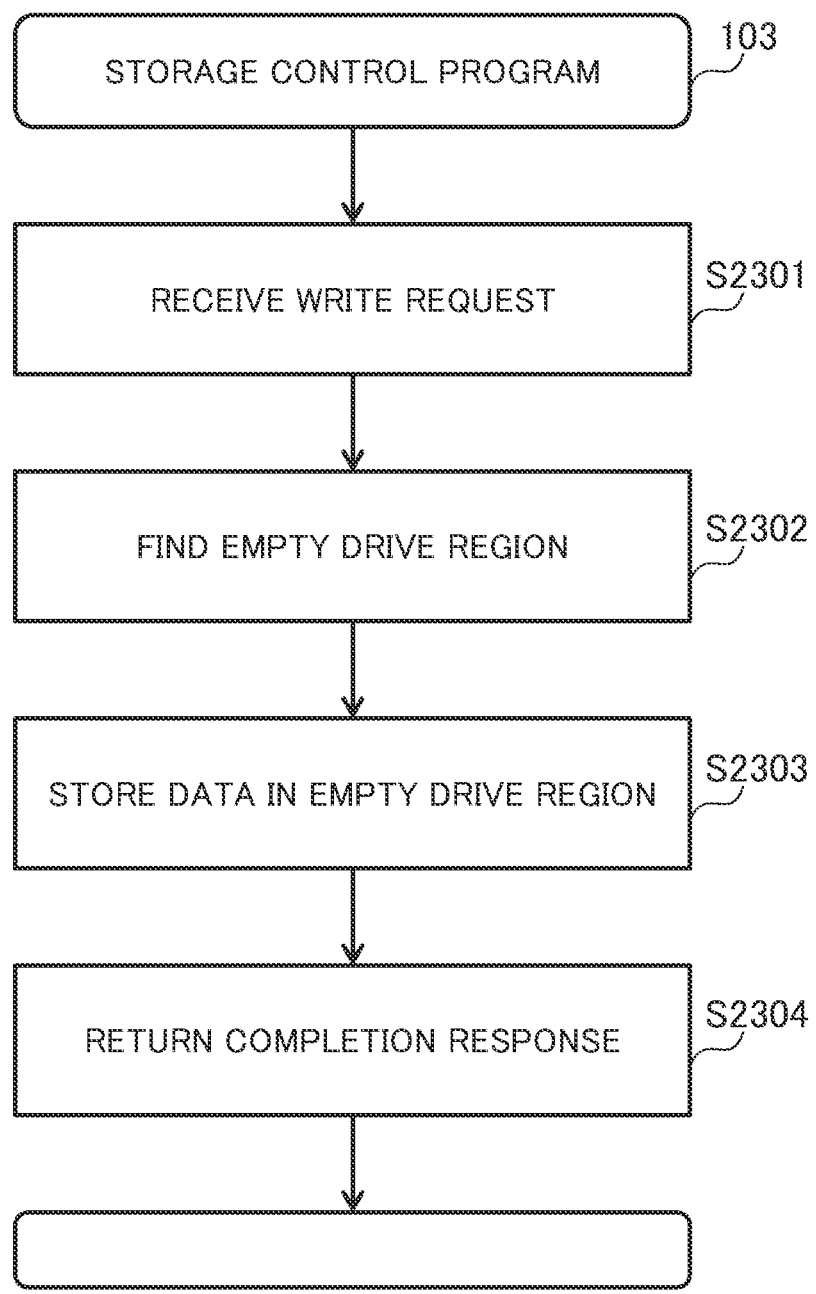
FIG. 23 illustrates one example of a procedure of processing executed by a storage control program according to the embodiment of the invention.

FIG. 23 illustrates an example of a procedure of processing executed by the storage control program 103A.

The storage control program 103A can manage a difference between write data for a volume region in the snapshot volume and data in a reference destination region of the volume region.

First, when receiving a write request specifying a member volume (S2301), the storage control program 103A refers to the snapshot mapping table 2100 (and the page mapping table 700A), and determines an empty drive region (storage region in a physical storage region) (S2302). The storage control program 103A then stores data associated with the write request in the drive region (S2303), registers the drive region, as a reference destination of a write destination volume region, in the snapshot mapping table 2100, and returns a completion response to the write request (S2304).

FIG. 24 illustrates an example of a procedure of processing executed by the migration program 2700 to migrate a member volume.

With a specified member volume, the migration program 2700 can migrate ownership of a member volume as a migration object between the servers 101 without copying data written to the member volume as the migration object while maintaining functionality of the snapshot function. With the specified member volume, the migration program 2700 selects either migration of the overall snapshot tree (overall migration) or migration of the ownership of only a specified member volume (single migration). Such selection may be performed according to a user instruction (for example, an instruction from the management server 105) or according to a previously set certain policy, for example. It is to be noted that "single migration" may be not only migration of the ownership of only a specified member volume but also migration of ownerships of the specified member volume and a member volume lower than the specified member volume.

First, the migration program 2700 determines a destination server 101 of the specified member volume (S2401). In this case, the server 101B is assumed to be determined.

Subsequently, the migration program 2700 selects a range to which a member volume as a migration object belongs (i.e., selects either single migration or overall migration) (S2402).

When single migration is selected, the migration program 2700 defines only the specified member volume as the migration object.

When overall migration is selected, the migration program 2700 refers to the snapshot management table 2000, and defines any member volume in a dependence relationship with the specified member volume as the migration object (S2403).

For each migration-object member volume, the migration program 2700 copies, to the destination server 101B, at least a snapshot mapping table portion (page mapping table portion as necessary) between a snapshot management table portion and the snapshot mapping table portion corresponding to the member volume (S2404). Finally, the migration program 2700 migrates the ownership of any migration-object member volume to the destination server 101B (S2405).

Figure 25:
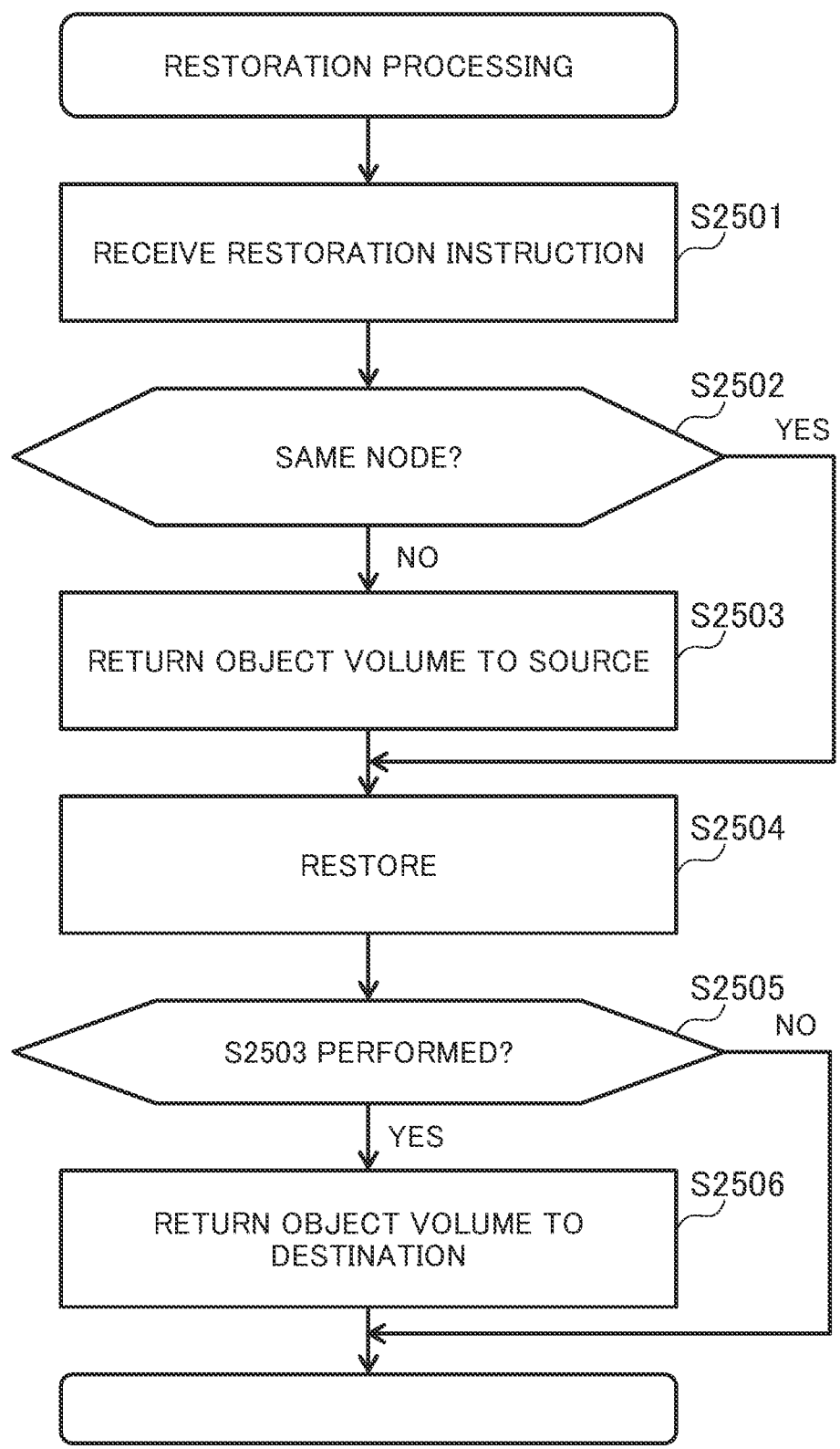
FIG. 25 illustrates one example of a procedure of restoration processing according to the embodiment of the invention.

FIG. 25 illustrates an example of a procedure of restoration processing.

A restoration program of the destination server 101B receives a restoration instruction specifying a snapshot volume as a restoration object (S2501). The restoration program of the destination server 101B refers to the snapshot management table 2000 in the destination server 101B, and determines whether a parent volume of the snapshot volume as the restoration object exists in the destination server 101B (S2502). In case of the single migration, since a reference destination of the snapshot volume remains in a source server, a determination result is false in S2502.

When the determination result of S2502 is false (S2502: NO), the restoration program of the destination server 101B allows the migration program 2700 of the destination server 101B to return a restoration object volume to a server 101A (source server 101A of the restoration object volume) in which a parent volume (reference destination volume) of the restoration object volume exists (S2503). This means migration of the snapshot volume as the restoration object (migration of the ownership of the volume) from the server 101B to the server 101A.

In the server 101A or 101B in which the snapshot volume as the restoration object exists, the restoration program restores the snapshot volume as the restoration object to a normal volume (S2504). The term "normal volume" means a volume in which a reference region of each volume region is a drive region. Specifically, in S2504, the restoration program copies, to a record (record in the snapshot mapping table) of each volume region in a restoration object volume, a record indicating a drive region as a reference destination of a parent volume of the volume so that a reference destination region of each volume region in the snapshot volume as the restoration object is a drive region.

After S2504, if S2503 has been performed (S2505: YES), the restoration program of the server 101A allows the migration program of the server 101A to return (migrate) the restored volume to the server 101B (S2506). This means migration of the restored volume (migration of the ownership of that volume) from the server 101A to the server 101B.

Not only for restoration but also for another operation associated with a snapshot, a single-migrated volume may be returned to the source server 101A and subjected to predetermined processing in the source server 101A and then returned to the destination server 101B.

As described above, when the server 101A identifies that any one of member volumes is specified as a volume of the migration object from the server 101A to the server 101B, the server 101A copies, to the server 101B, portions of the snapshot mapping table 2100, i.e., a snapshot mapping table portion (one example of region control data) on at least the specified member volume among all the member volumes (all volumes represented by the snapshot tree) including the specified member volume and a snapshot management table portion (one example of region control data). This makes it possible to migrate ownership of a volume while maintaining functionality of the snapshot function.

When overall migration is selected, the server 101A defines all member volumes, which are represented by the snapshot tree including the node corresponding to the specified member volume, as migration objects, and copies, to the server 101B, the snapshot mapping table portion and the snapshot management table portion for each of all the member volumes. Since the ownership of any of the member volumes is migrated to the destination server 101B, the server 101B can refer to any of the snapshot volumes thereafter.

When single migration is selected, the server 101A defines, as migration objects, only some snapshot volumes containing a specified snapshot volume among all member volumes represented by the snapshot tree including a node corresponding to the specified snapshot volume, and copies, to the server 101B, the snapshot mapping table portion and the snapshot management table portion for each of those some snapshot volumes. Such some snapshot volumes include the specified snapshot volume, or the specified snapshot volume and a lower snapshot volume than the specified snapshot volume in the snapshot tree. Since the snapshot relationship is relayed between the servers, ownership of a volume can be migrated while maintaining functionality of the snapshot function.

When at least one snapshot volume in those some snapshot volumes is a restoration object, and when a reference destination of at least one volume region in the one snapshot volume is a volume in the server 101A, the server 101B returns the at least one snapshot volume to the server 101A. When the reference destination of the volume region in the returned at least one snapshot volume is a volume region in a volume of the server 101A (volume of which the ownership is owned by the server 101A), the server 101A changes the reference destination to a drive region based on the snapshot mapping table 2100. Subsequently, the server 101A returns the restored volume to the server 101B. As a result, restoration of a snapshot volume can be achieved through migration of some of snapshot volumes even if the server 101 having the ownership of the migrated snapshot volume is different from a server having the ownership of a volume as a reference source of such a snapshot volume.

Figure 26:
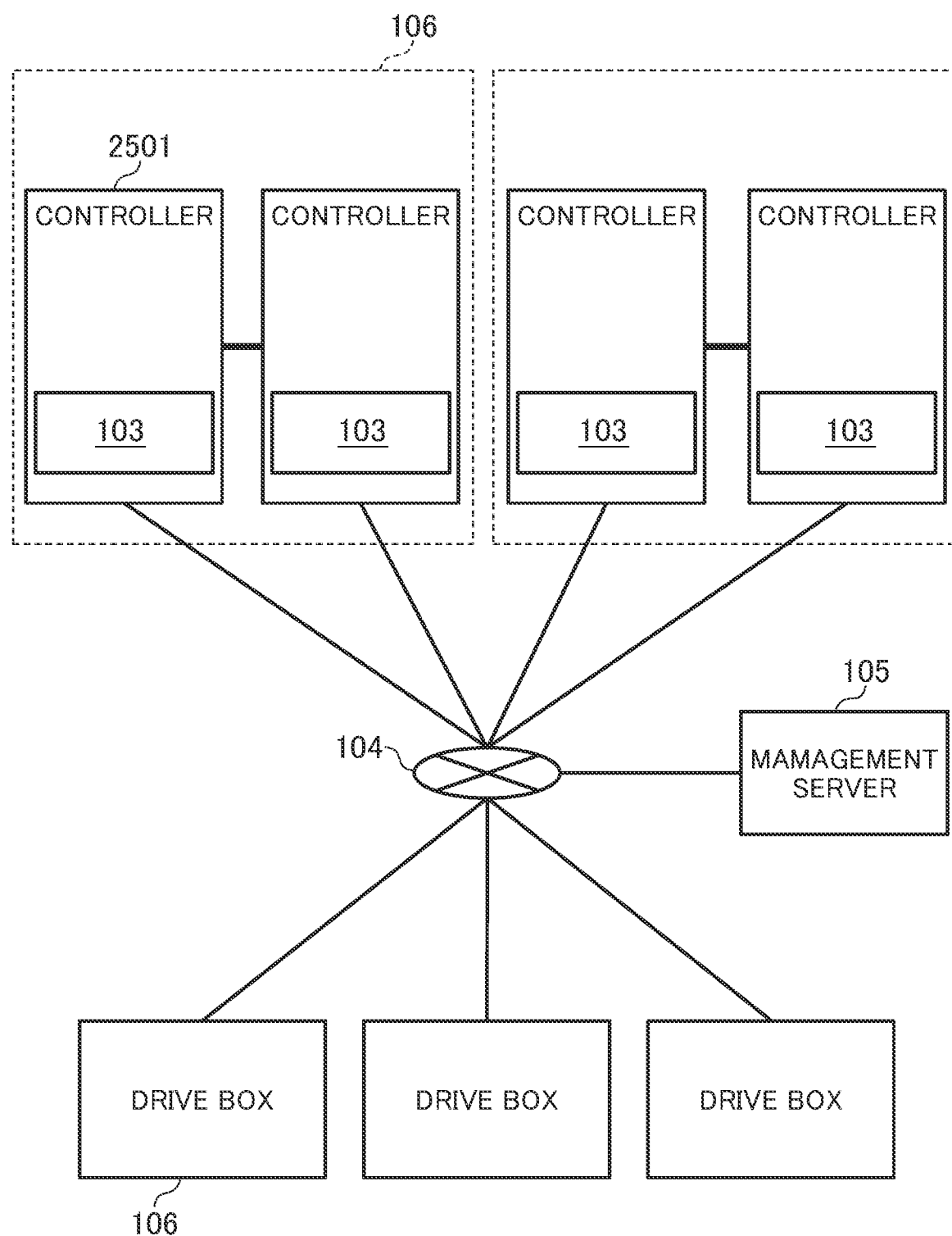
FIG. 26 illustrates an outline of a distributed storage system according to one modification of the embodiment of the invention.

Although one embodiment of the invention has been described hereinbefore, the invention is not limited thereto. Those skills in the art can easily modify, add, or transform each element of the above embodiment within the scope of the invention. For example, as illustrated in FIG. 26, each server 106 may be configured of duplexed controllers 2501 each of which performs the storage control program 103.

The above-described configurations, functions, processing sections, and/or processing units may be partially or entirely implemented by hardware through design with an integrated circuit, for example. Information of a program, a table, or a file enabling each function can be stored in a storage device such as a nonvolatile semiconductor memory, a hard disc drive, and a solid state device (SSD), or a computer-readable non-transitory data storage medium such as an IC card, a secure digital (SD) card, and a digital versatile disc (DVD).

LIST OF REFERENCE SIGNS

101: Server
106: Drive box

What is claimed is:

1. A volume migration method for migrating a volume between computers among a plurality of computers configuring a distributed storage system,
   the respective plurality of computers being accessibly connected via a communication network to one or more physical storage devices in a storage unit,
   for each of the plurality of computers,
   the computer performing input/output (I/O) of data to/from an owner volume of which the ownership is owned by the computer,
   the computer writing data, the data being written into a volume region as a write destination of the owner volume of the computer, into a storage region allocated to the volume region as the write destination in a physical storage region provided by the one or more physical storage devices,
   the computer having domain mapping data indicating a relationship between a volume region in the owner volume of the computer and a storage region in the physical storage region and being metadata for the owner volume,
   wherein in the volume migration method,
   the third computer identifies that a volume as a migration object from a third computer to a fourth computer is a storage owner volume,
   the storage owner volume is an owner volume to which a storage function is applied, the storage function requiring control data for I/O of data, the control data being metadata other than the domain mapping data, in place of or in addition to the domain mapping data,
   the third computer migrates ownership of the storage owner volume to the fourth computer, and copies the control data of the storage owner volume to the fourth computer, wherein
   the physical storage devices have different I/O performances,
   the storage owner volume of the third computer is an auto tiering owner volume being an owner volume to which an auto tiering function is applied,
   the auto tiering function is a storage function performing auto tiering of changing a physical storage device as a location destination of data written into a volume region in the storage owner volume according to I/O frequency of the volume region at regular intervals or every time a predetermined event occurs,
   the third computer has I/O statistical data as control data indicating a correspondence relationship between the volume region and the I/O frequency for the auto tiering owner volume,
   when the third computer identifies that the volume as the migration object from the third computer to the fourth computer is the auto tiering owner volume,
   copying by the third computer, to the fourth computer, a domain mapping data of the auto tiering owner volume and the I/O statistical data for the auto tiering owner volume, and
   after the auto tiering owner volume is migrated to the fourth computer,
   updating by the fourth computer the copied I/O statistical data according to I/O to/from the auto tiering owner volume, and performing auto tiering for the auto tiering owner volume based on the I/O statistical data.

2. A distributed storage system, comprising:
   a storage unit including one or more physical storage devices; and
   a plurality of computers accessibly connected via a communication network to each of the one or more physical storage devices in the storage unit,
   wherein, for each of the plurality of computers,
   the computer performs input/output (I/O) of data to/from an owner volume, the ownership of which is owned by a first computer,
   the computer writes data, the data being written into a volume region as a write destination of the owner volume of the computer, into a storage region allocated to the volume region as the write destination in a physical storage region provided by the one or more physical storage devices,
   the computer has domain mapping data indicating a relationship between a volume region in the owner volume of the computer and a storage region in the physical storage region and being metadata for that owner volume,
   when the owner volume of the computer is a migration object, the computer migrates the ownership of the volume to a second computer as a destination,
   an owner volume of a third computer is a storage owner volume,
   the storage owner volume is an owner volume to which a storage function is applied, the storage function is to obtain control data related to data I/O, the control data being metadata other than the domain mapping data, in place of or in addition to the domain mapping data,
   when the third computer identifies that a volume as a migration object from the third computer to a fourth computer is the storage owner volume, the third computer copies the control data of the storage owner volume to the fourth computer,
   the physical storage devices have different I/O performances,
   the storage owner volume of the third computer is an auto tiering owner volume being an owner volume to which an auto tiering function is applied,
   the auto tiering function is a storage function performing auto tiering of changing a physical storage device as a location destination of data written into a volume region in the storage owner volume according to I/O frequency of the volume region at regular intervals or every time a predetermined event occurs, the third computer has I/O statistical data as control data indicating a correspondence relationship between the volume region and the I/O frequency for the auto tiering owner volume, when the third computer identifies that the volume as the migration object from the third computer to the fourth computer is the auto tiering owner volume, the third computer copies, to the fourth computer, a domain mapping data of the auto tiering owner volume and the I/O statistical data for the auto tiering owner volume, and after the auto tiering owner volume is migrated to the fourth computer, the fourth computer updates the copied I/O statistical data according to I/O to/from the auto tiering owner volume, and performs auto tiering for the auto tiering owner volume based on the I/O statistical data.

3. The distributed storage system according to claim 2, wherein the storage owner volume of the third computer is a group storage owner volume being an owner volume to which a group storage function is applied, the group storage function is a storage function that relates to a volume region in the owner volume to a volume region in another volume or to a storage region mapped to the volume region in such another volume, the third computer has domain control data as control data indicating a relationship between the volume region in the group storage owner volume and the volume region in another volume or the storage region mapped to the volume region in such another volume, and when the third computer identifies that the volume as the migration object from the third computer to the fourth computer is the group storage owner volume, the third computer copies the domain control data on the group storage owner volume to the fourth computer.

4. The distributed storage system according to claim 3, wherein the third and fourth computers exist in a primary site, the group storage owner volume of the third computer includes one or more primary volumes, each primary volume being a copy source in asynchronous remote copy, to which an asynchronous remote copy function is applied, the third computer has a journal volume on the one or more primary volumes and ownership of the journal volume, for each of the one or more primary volumes, a fifth computer exists in one of one or more secondary sites, the fifth computer having a secondary volume as a copy destination of the primary volume, the secondary volume paring with the primary volume, the asynchronous remote copy function is a group storage function of, when data is written to a volume region in any of the primary volumes, writing a journal containing the data to the journal volume, and transferring the data in the journal written to the journal volume to a computer having a secondary volume paring with the primary volume to which the data is written, the third computer has journal mapping data, the journal mapping data, for each volume region in the journal volume owned by the third computer, includes domain control data indicating a volume region in a primary volume to which data contained in a journal written to the volume region is written or indicating a reflection destination region of the journal, when the third computer verifies that the volume as the migration object from the third computer to the fourth computer is one of the primary volumes, the first fourth computer copies the domain control data on the primary volume in the journal mapping data to the fourth computer, and the fourth computer specifies a journal and a reflection destination specified based on the copied domain control data, reads data in the journal from the physical storage region, and transfers the read data to the computer as the specified reflection destination.

5. The distributed storage system according to claim 4, wherein copy of the domain control data from the third computer to the fourth computer is handover from the third computer to the fourth computer of authority of read and reflection of the journal on the volume region in the journal volume indicated by the domain control data, the fourth computer notifies the third computer of copy completion notice indicating the volume region in the journal volume on the journal read from the physical storage region according to the authority handed over from the third computer, and the third computer manages a volume region indicated by the copy completion notice in the journal volume as a volume region to which the journal is allowed to be written.

6. The distributed storage system according to claim 2, wherein a group storage owner volume of the third computer is each of one or more member volumes to which a snapshot function is applied, the snapshot function is a function of acquiring a snapshot of a specified volume, the one or more member volumes include one or more snapshot volumes, and a base volume as a direct or indirect base of the one or more snapshot volumes, each of the one or more snapshot volumes is a volume as a snapshot of the base volume or one of the snapshot volumes, the third computer includes snapshot management data indicating a snapshot tree representing a relationship of the one or more member volumes, and snapshot mapping data including domain control data indicating a relationship between a volume region and a reference destination region of the volume region for each of one or more snapshot volumes in the one or more member volumes, and when the third computer identifies that one of the member volumes is specified as the volume as the migration object from the third computer to a fourth computer, the third computer copies, to the fourth computer, domain control data on at least the specified member volume among all the member volumes including the specified member volume in the snapshot mapping data and the snapshot management data.

7. The distributed storage system according to claim 6, wherein the third computer specifies, as migration objects, all member volumes represented by the snapshot tree including a node corresponding to the specified member volume, and copies, to the second computer, domain control data for each of all the member volumes in the snapshot mapping data and the snapshot management data.

8. The distributed storage system according to claim 6, wherein the third computer specifies, as migration objects, only some snapshot volumes including the specified snapshot volume in all the member volumes represented by the snapshot tree including a node corresponding to the specified snapshot volume, and copies, to the second computer, domain control data on those some snapshot volumes in the snapshot mapping data and the snapshot management data, and such some snapshot volumes include the specified snapshot volume, or the specified snapshot volume and lower snapshot volumes in the snapshot tree than the specified snapshot volume.

9. The distributed storage system according to claim 8, wherein when at least one snapshot volume in the some snapshot volumes migrated to the second computer is a restoration object, and when a reference destination region of at least one volume region in the one snapshot volume is a volume region in a volume of the third computer, the fourth computer returns the at least one snapshot volume to the third computer, when a reference destination of a volume region in the returned at least one snapshot volume is the volume region in the volume of the third computer, the third computer changes the reference destination to the storage region in the physical storage region based on the snapshot mapping data, and after that, the at least one snapshot volume is restored and becomes a migration object from the third computer to the fourth computer.

10. The distributed storage system according to claim 2, wherein the third computer identifies a storage function used for the storage owner volume among a plurality of storage functions, and determines control data to be copied to the fourth computer and a volume to be a migration object in addition to the storage owner volume according to a result of such identification.

* * * * *